United States Patent
Kim et al.

(10) Patent No.: US 10,348,852 B2
(45) Date of Patent: Jul. 9, 2019

(54) METHOD FOR DETERMINING TERMINAL IDENTIFIER IN WIRELESS COMMUNICATION SYSTEM SUPPORTING DEVICE-TO-DEVICE COMMUNICATION AND APPARATUS FOR SAME

(71) Applicant: LG ELECTRONICS INC., Seoul (KR)

(72) Inventors: Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/113,354

(22) PCT Filed: Jan. 21, 2015

(86) PCT No.: PCT/KR2015/000617
§ 371 (c)(1),
(2) Date: Jul. 21, 2016

(87) PCT Pub. No.: WO2015/111909
PCT Pub. Date: Jul. 30, 2015

(65) Prior Publication Data
US 2017/0019937 A1  Jan. 19, 2017

Related U.S. Application Data

(60) Provisional application No. 61/929,919, filed on Jan. 21, 2014.

(51) Int. Cl.
*H04W 76/14* (2018.01)
*H04W 76/11* (2018.01)
(Continued)

(52) U.S. Cl.
CPC ............ *H04L 67/303* (2013.01); *H04W 8/26* (2013.01); *H04W 76/11* (2018.02); *H04W 76/14* (2018.02);
(Continued)

(58) Field of Classification Search
CPC . H04W 8/005; H04W 76/021; H04W 76/023; H04W 8/26–28; H04W 76/14; H04W 76/23
See application file for complete search history.

(56) References Cited

U.S. PATENT DOCUMENTS

2010/0165882 A1  7/2010  Palanki et al.
2010/0317291 A1  12/2010  Richardson
(Continued)

FOREIGN PATENT DOCUMENTS

KR  10-2013-0010083 A  1/2013
WO  WO 2013/028044 A2  2/2013
(Continued)

OTHER PUBLICATIONS

Renesas Mobile Europe Ltd, "Solution for ProSe UE Discovery," SA WG2 Temporary Document, SA WG2 Meeting #96, S2-131194, San Diego, California, USA, Apr. 8-12, 2013, pp. 1-11.

*Primary Examiner* — Marcus Smith
(74) *Attorney, Agent, or Firm* — Birch, Stewart, Kolasch & Birch, LLP

(57) ABSTRACT

The present invention discloses a method for determining a user equipment identifier in a wireless communication system supporting Device-to-Device (D2D) communication; and an apparatus for the method. More specifically, a method for determining an identifier of a UE in a wireless communication system supporting D2D communication comprises receiving, a first UE, a D2D signal including a D2D identifier from a second UE; and determining, the first UE, an identifier of the second UE on the basis of the received D2D identifier and measurement information of a cellular signal and/or information about resources in which the D2D signal is received.

6 Claims, 22 Drawing Sheets

(51) Int. Cl.
*H04W 8/26* (2009.01)
*H04L 29/08* (2006.01)
*H04B 17/318* (2015.01)
*H04B 17/336* (2015.01)
*H04W 56/00* (2009.01)
*H04W 72/12* (2009.01)
*H04W 84/04* (2009.01)

(52) U.S. Cl.
CPC .......... *H04B 17/318* (2015.01); *H04B 17/336* (2015.01); *H04W 56/001* (2013.01); *H04W 72/1215* (2013.01); *H04W 84/042* (2013.01)

(56) References Cited

U.S. PATENT DOCUMENTS

| | | |
|---|---|---|
| 2013/0288668 A1 | 10/2013 | Pragada et al. |
| 2014/0018010 A1* | 1/2014 | Gao ................... H04W 72/085 455/67.13 |
| 2014/0219095 A1 | 8/2014 | Lim et al. |
| 2014/0254523 A1* | 9/2014 | Chai ................... H04W 72/04 370/329 |
| 2014/0269419 A1* | 9/2014 | Han ................... H04W 76/14 370/254 |
| 2014/0286284 A1 | 9/2014 | Lim et al. |
| 2014/0315562 A1 | 10/2014 | Lim et al. |
| 2014/0355483 A1 | 12/2014 | Jang et al. |
| 2015/0305075 A1* | 10/2015 | Fodor ................... H04W 8/005 370/329 |
| 2016/0014589 A1* | 1/2016 | Niu ................... H04W 72/0413 370/329 |
| 2016/0150390 A1* | 5/2016 | Chen ................... H04W 68/00 370/311 |
| 2016/0198518 A1* | 7/2016 | Baek ................... H04W 76/043 370/329 |
| 2016/0227496 A1* | 8/2016 | Panteleev ......... H04W 36/0055 |

FOREIGN PATENT DOCUMENTS

| | | |
|---|---|---|
| WO | WO 2013/062310 A1 | 5/2013 |
| WO | WO 2013/062351 A1 | 5/2013 |
| WO | WO 2013/081433 A1 | 6/2013 |
| WO | WO 2013/162196 A1 | 10/2013 |
| WO | WO 2013/163599 A2 | 10/2013 |

* cited by examiner

[FIG. 1]
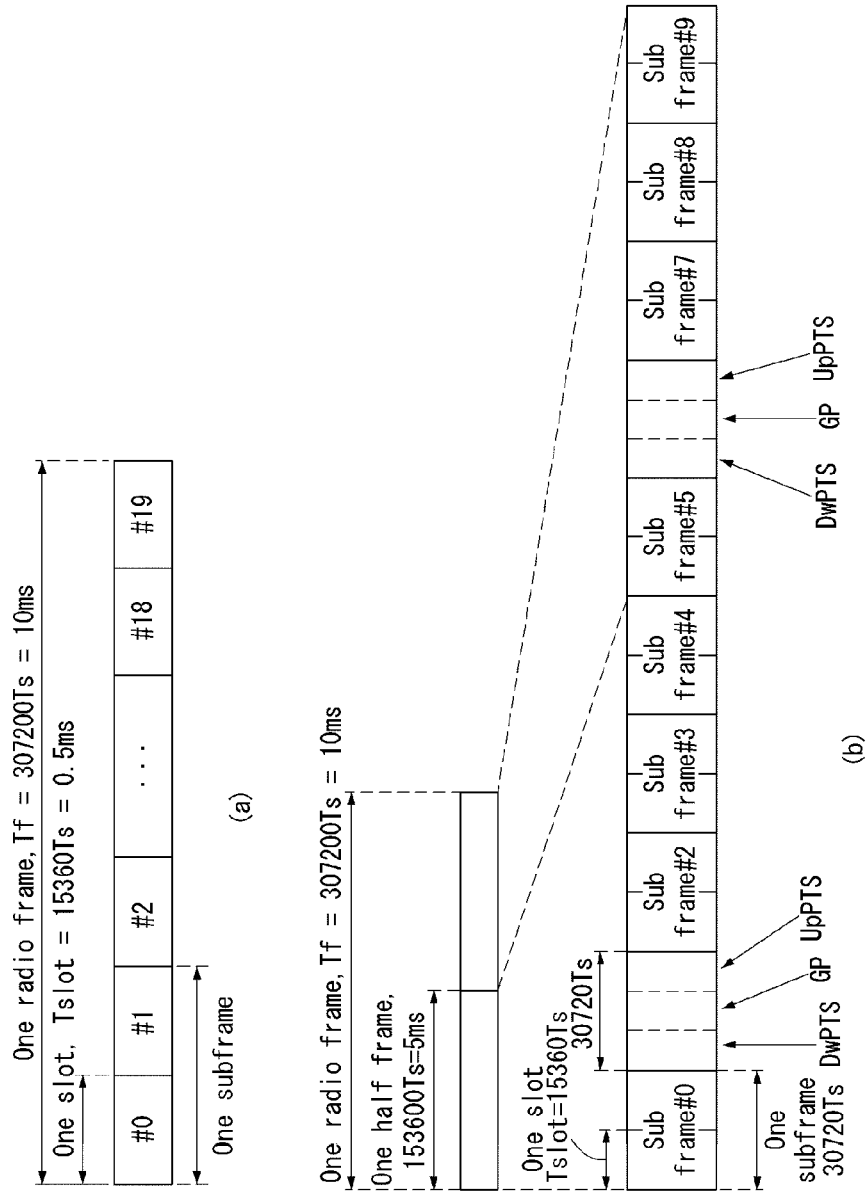

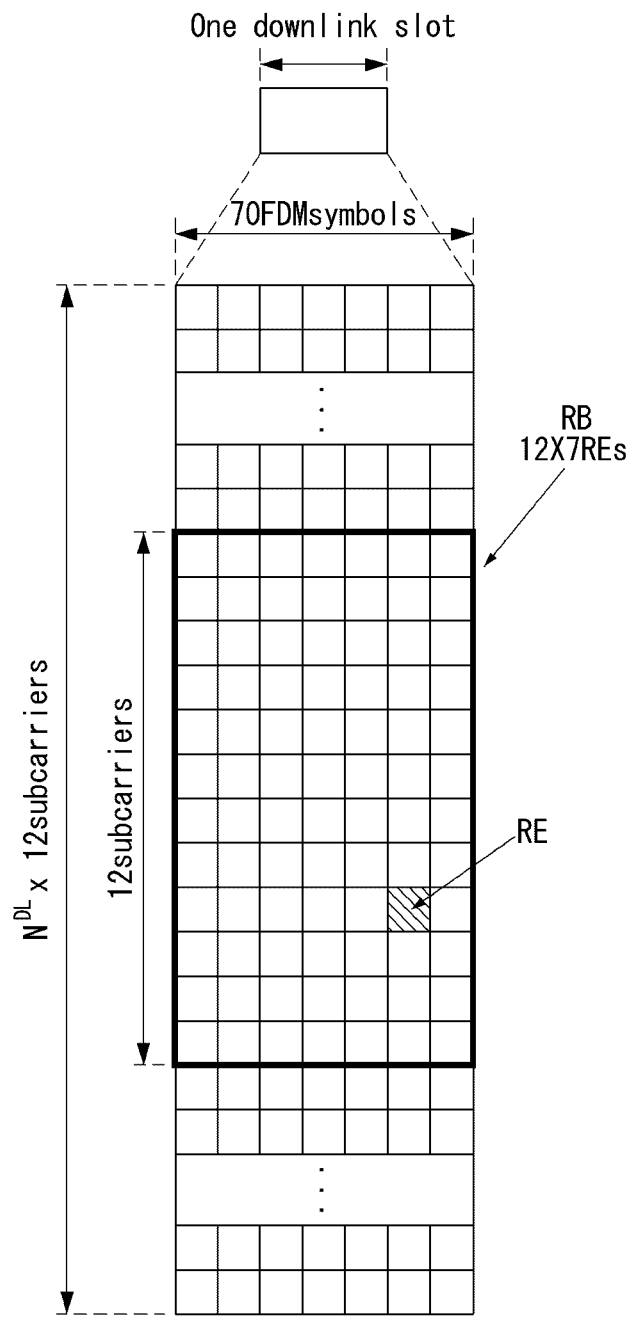
[FIG. 2]

[FIG. 3]
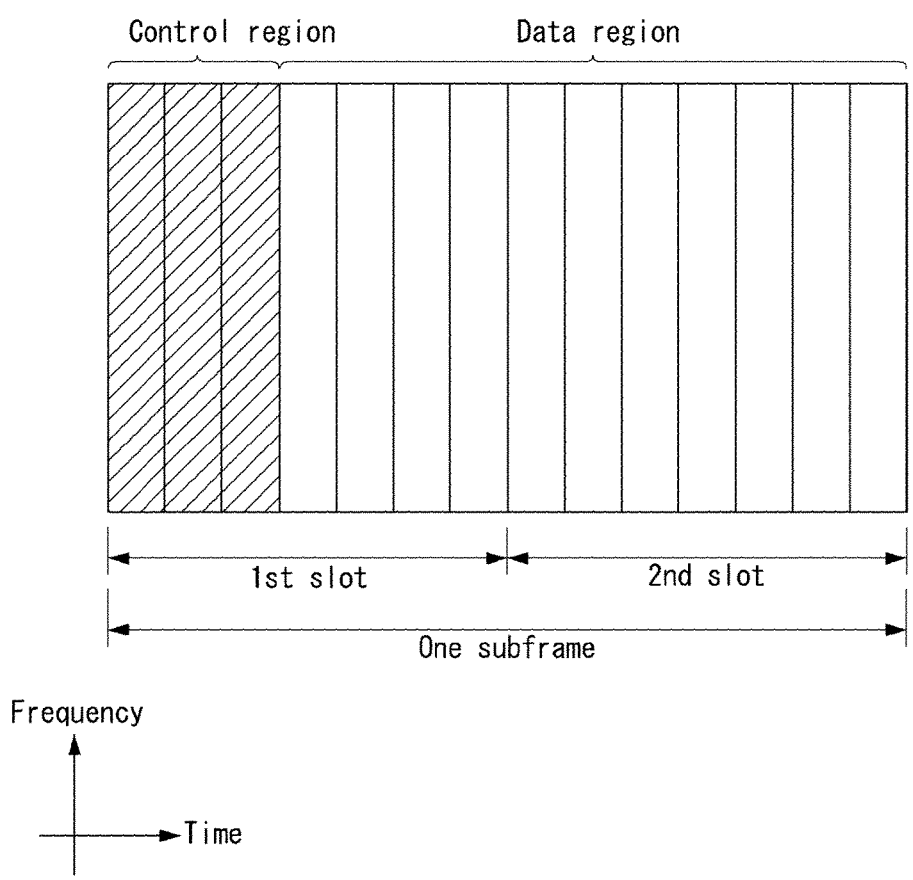

[FIG. 4]
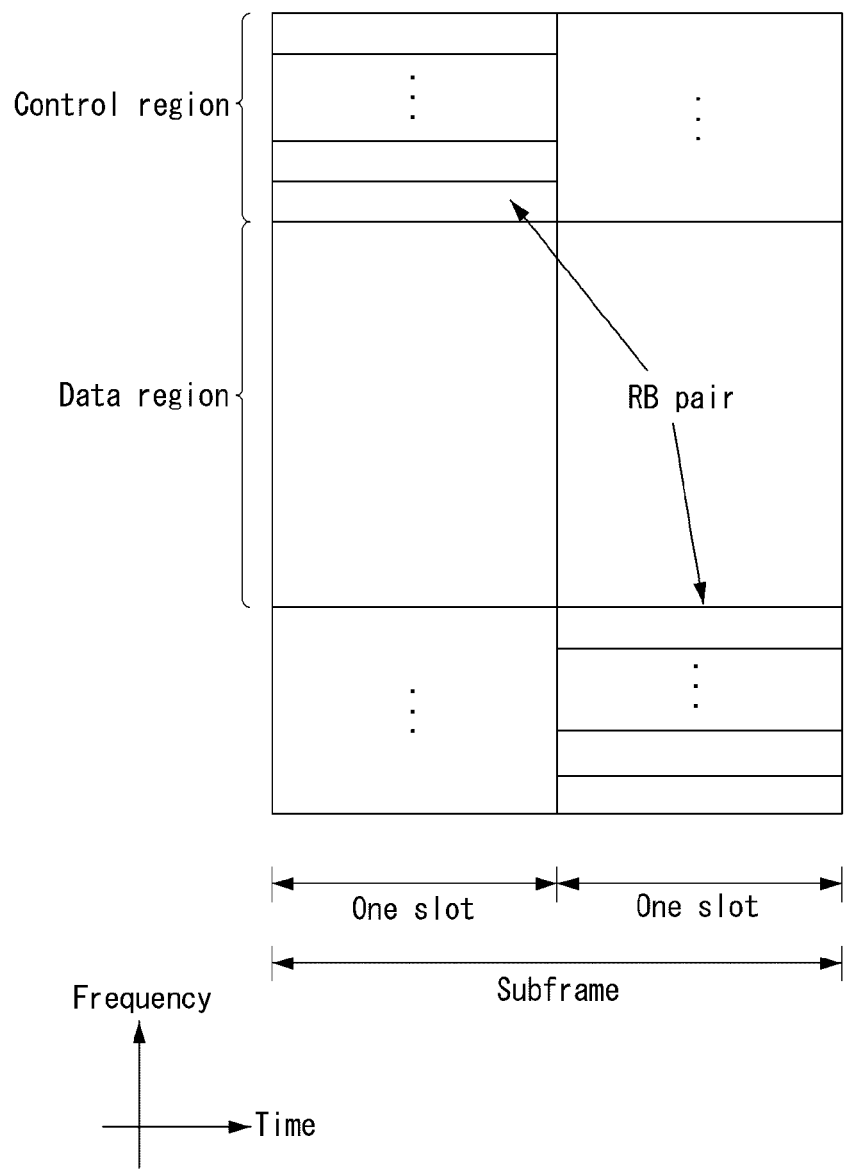

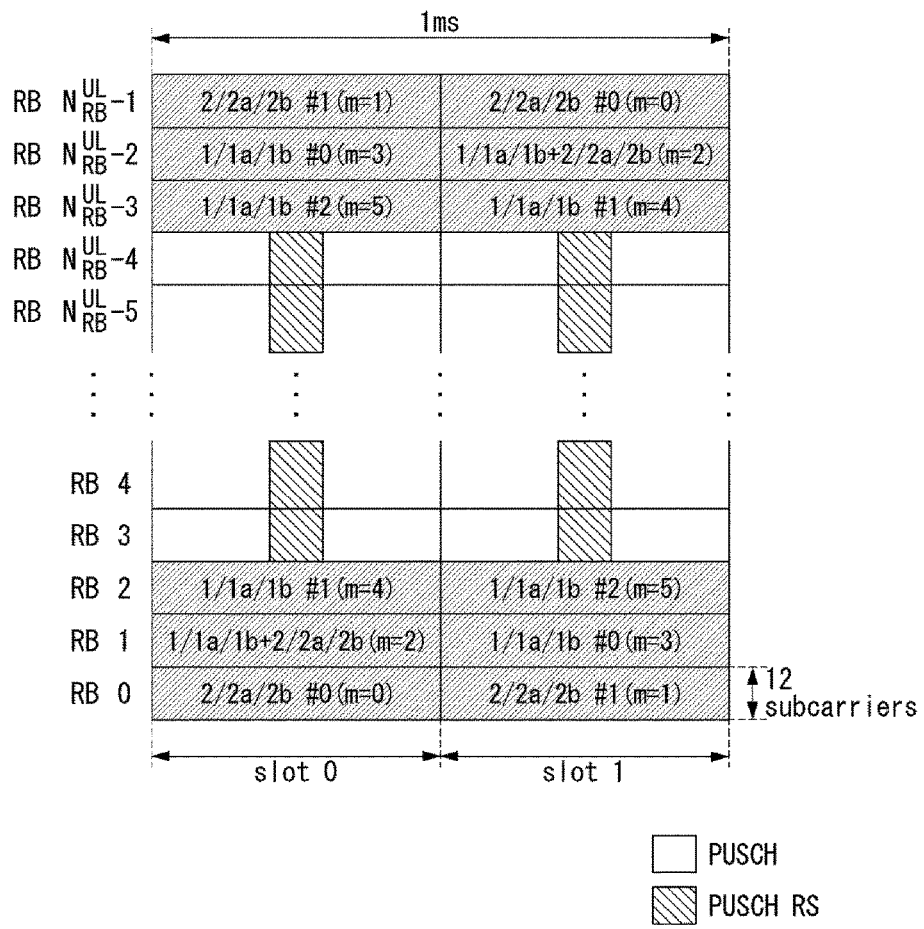

【FIG. 6】
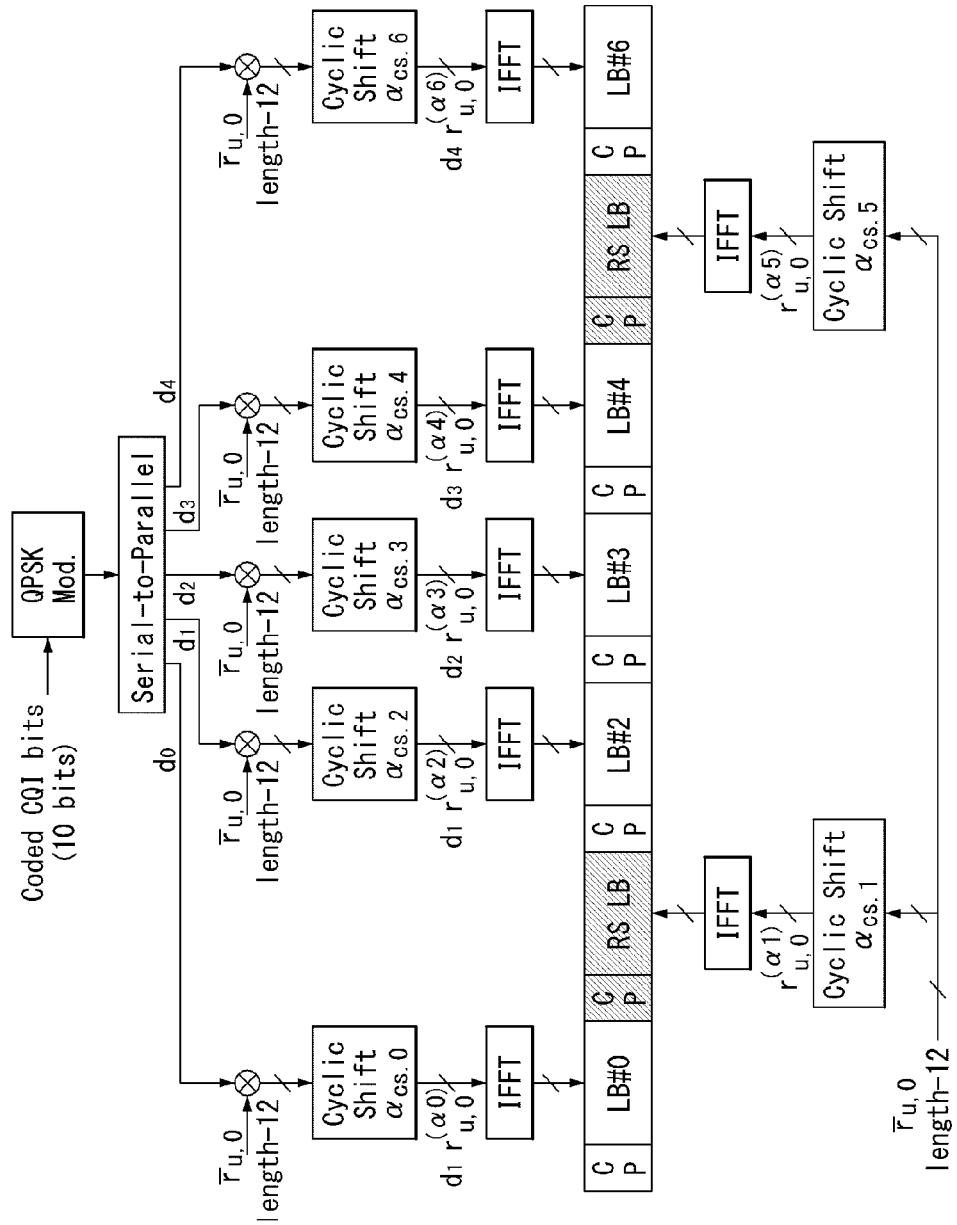

[FIG. 7]
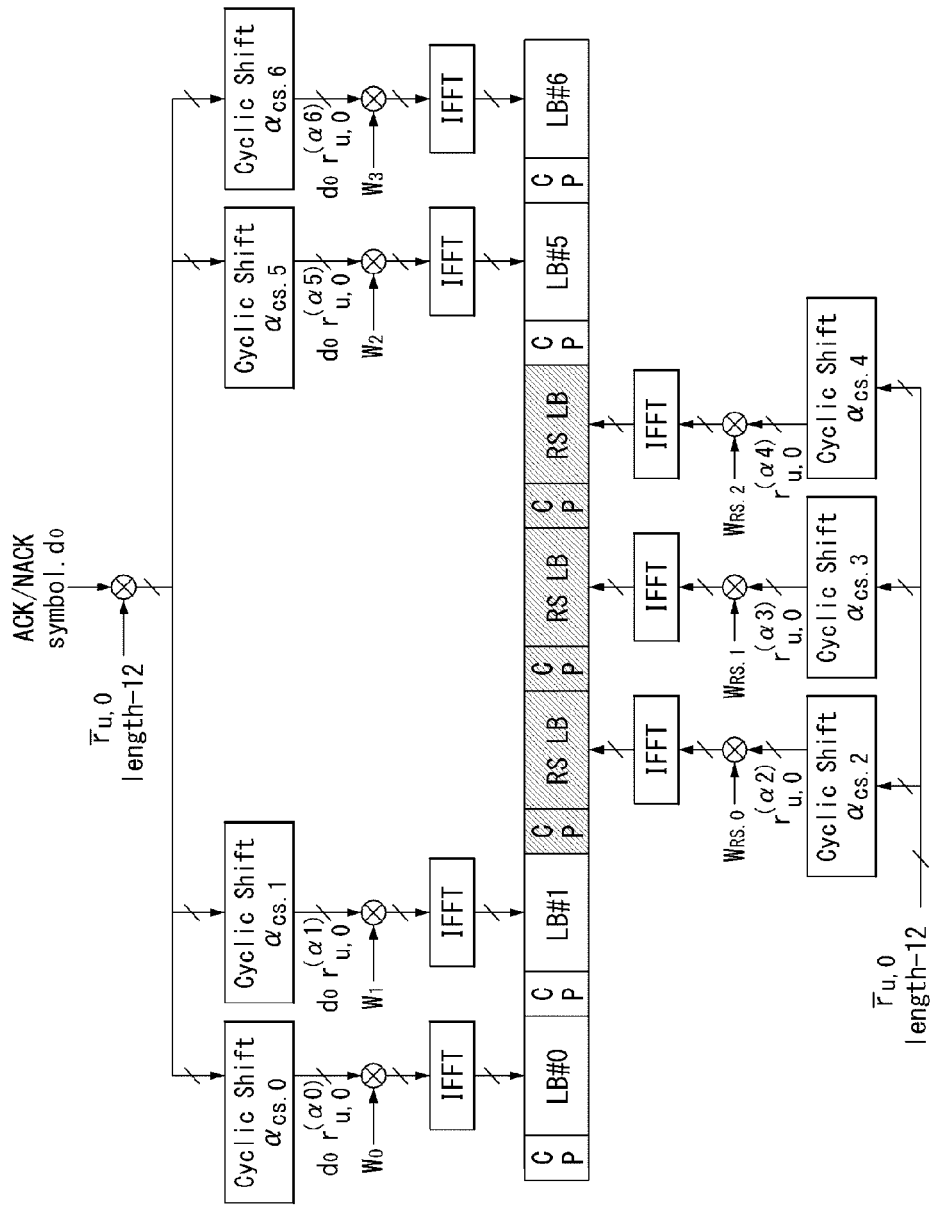

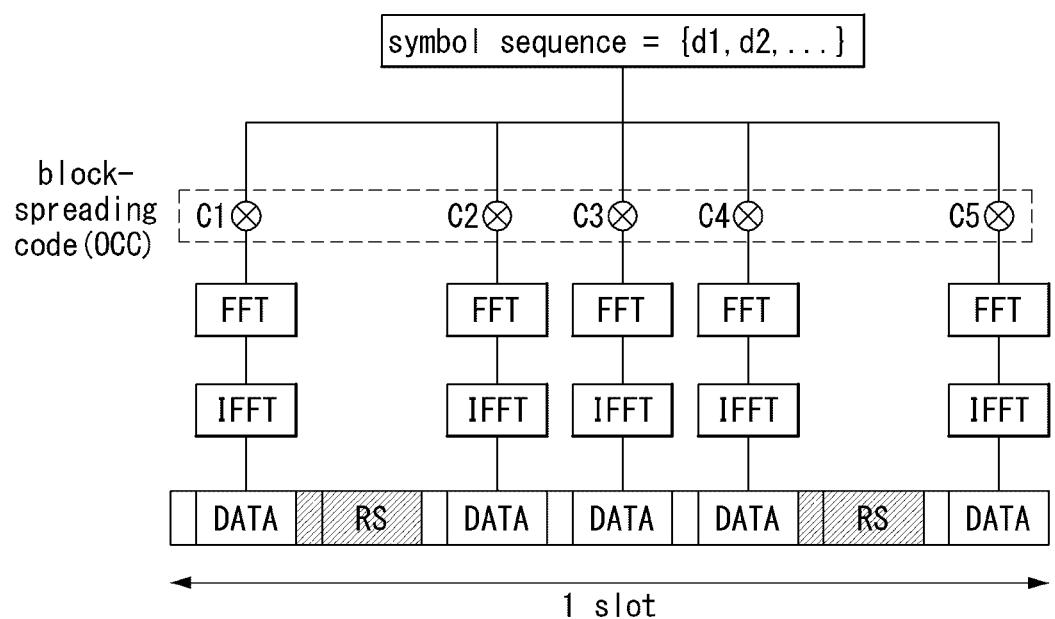
[FIG. 8]

[FIG. 9]
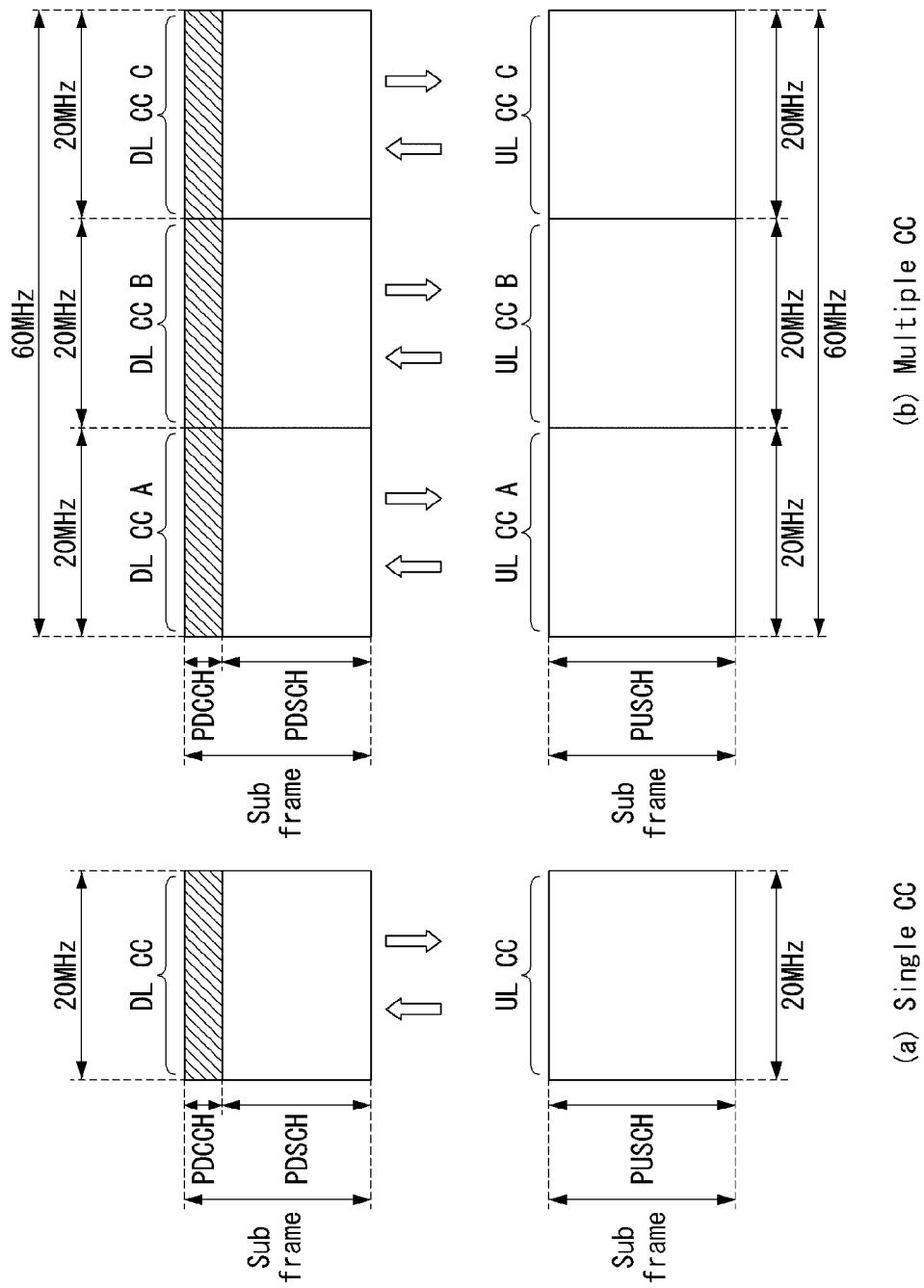

[FIG. 10]
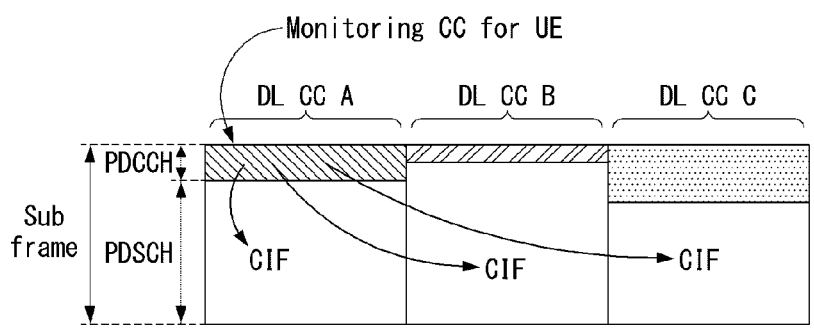
[FIG. 11]
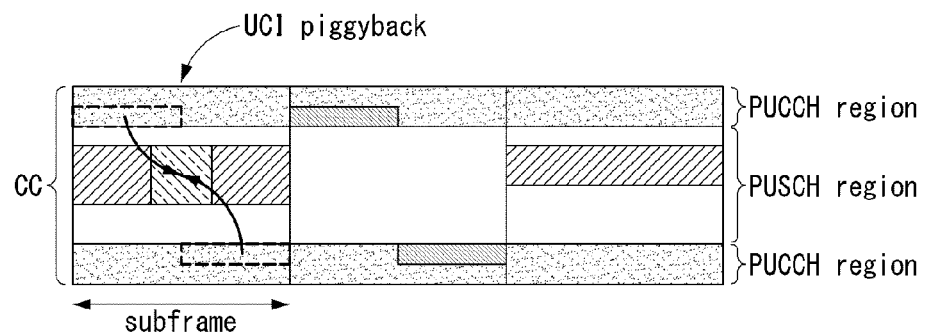

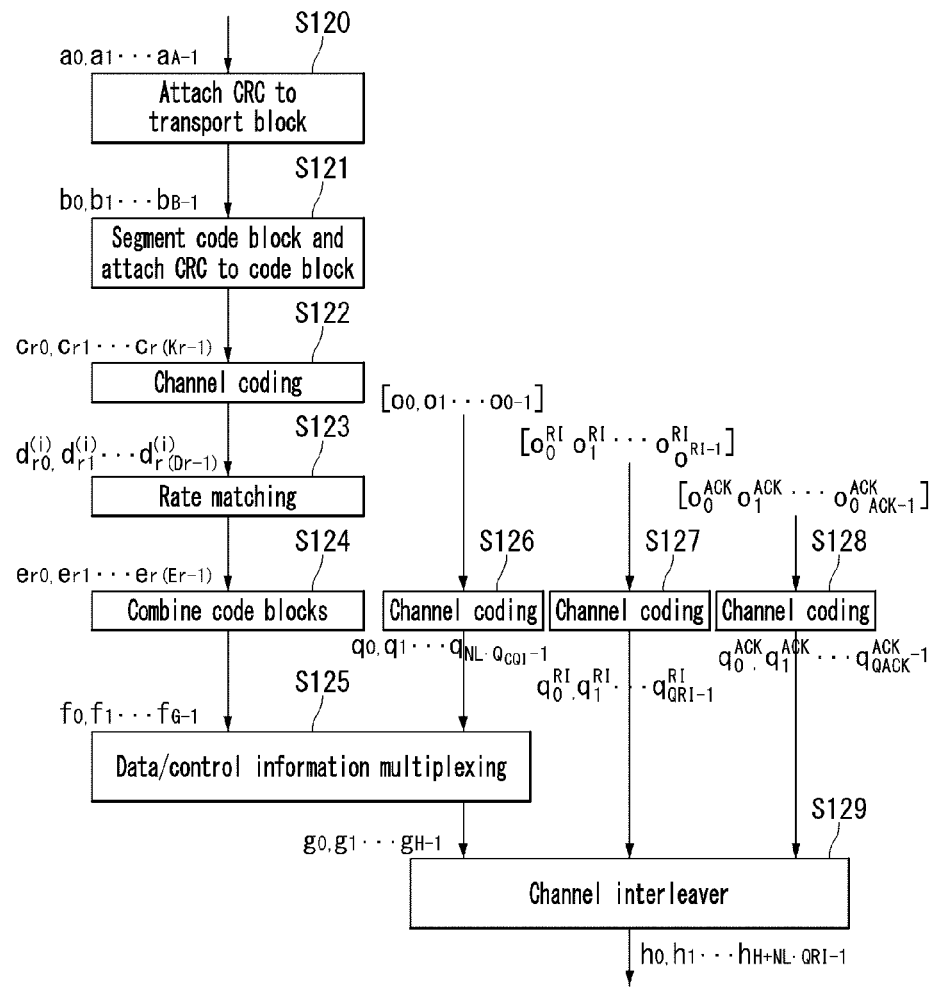
[FIG. 12]

【FIG. 13】
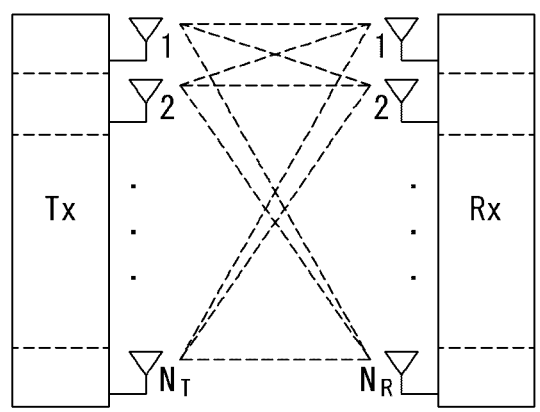
【FIG. 14】
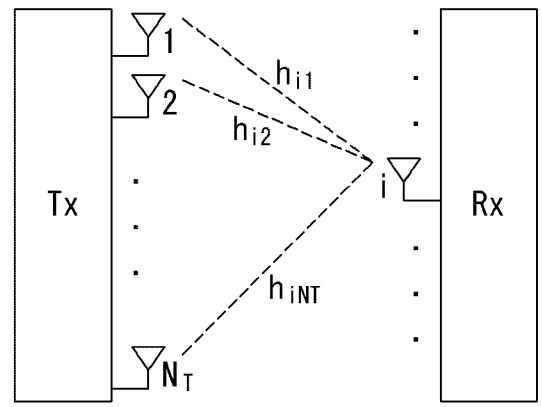

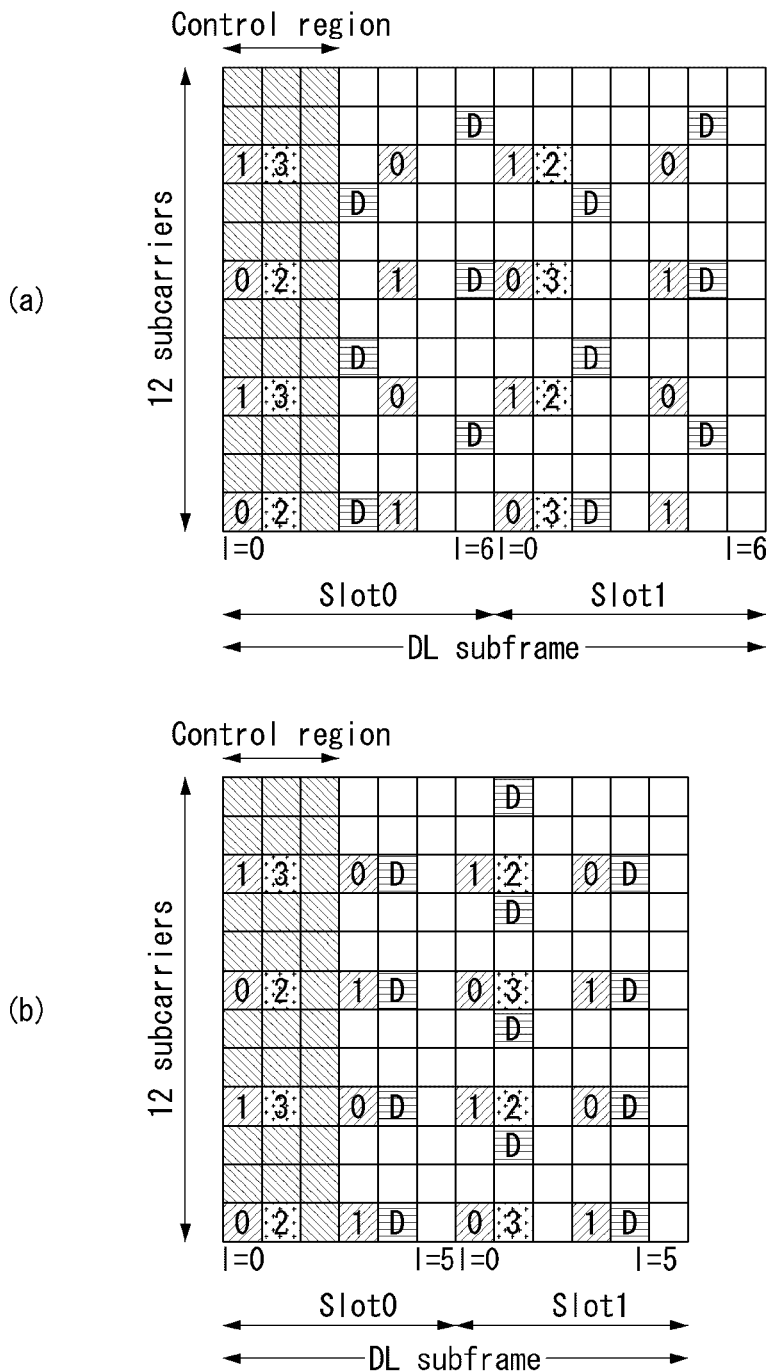
[FIG. 15]

[FIG. 16]
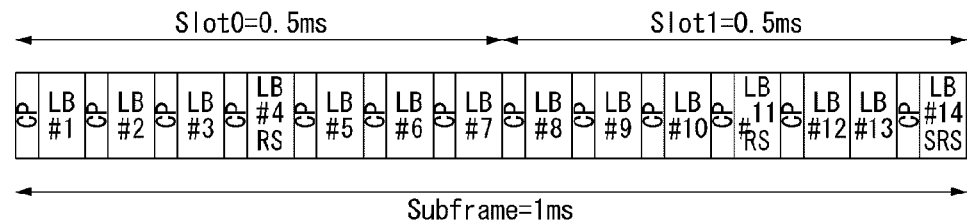
[FIG. 17]
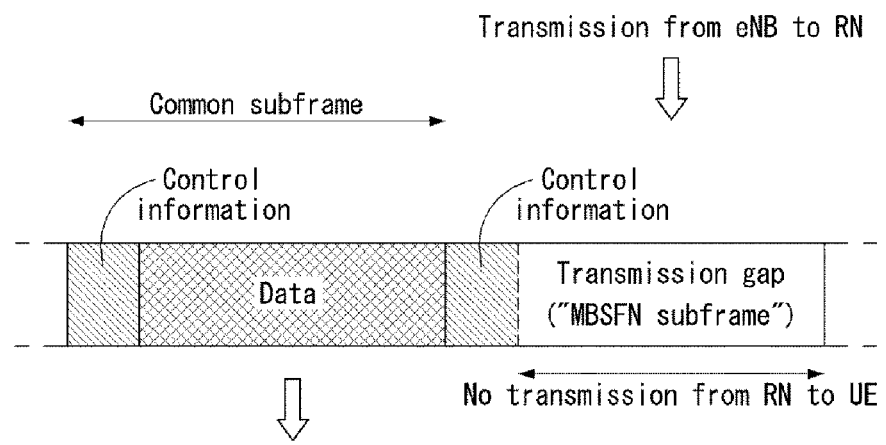
[FIG. 18]
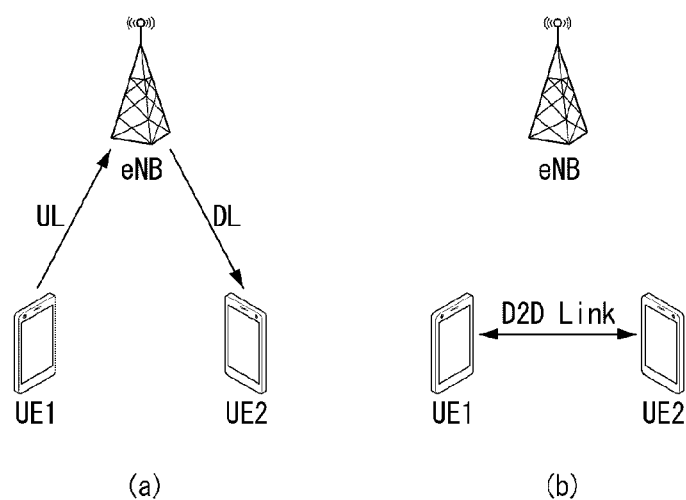
(a)　　　　　　　　(b)

[FIG. 19]
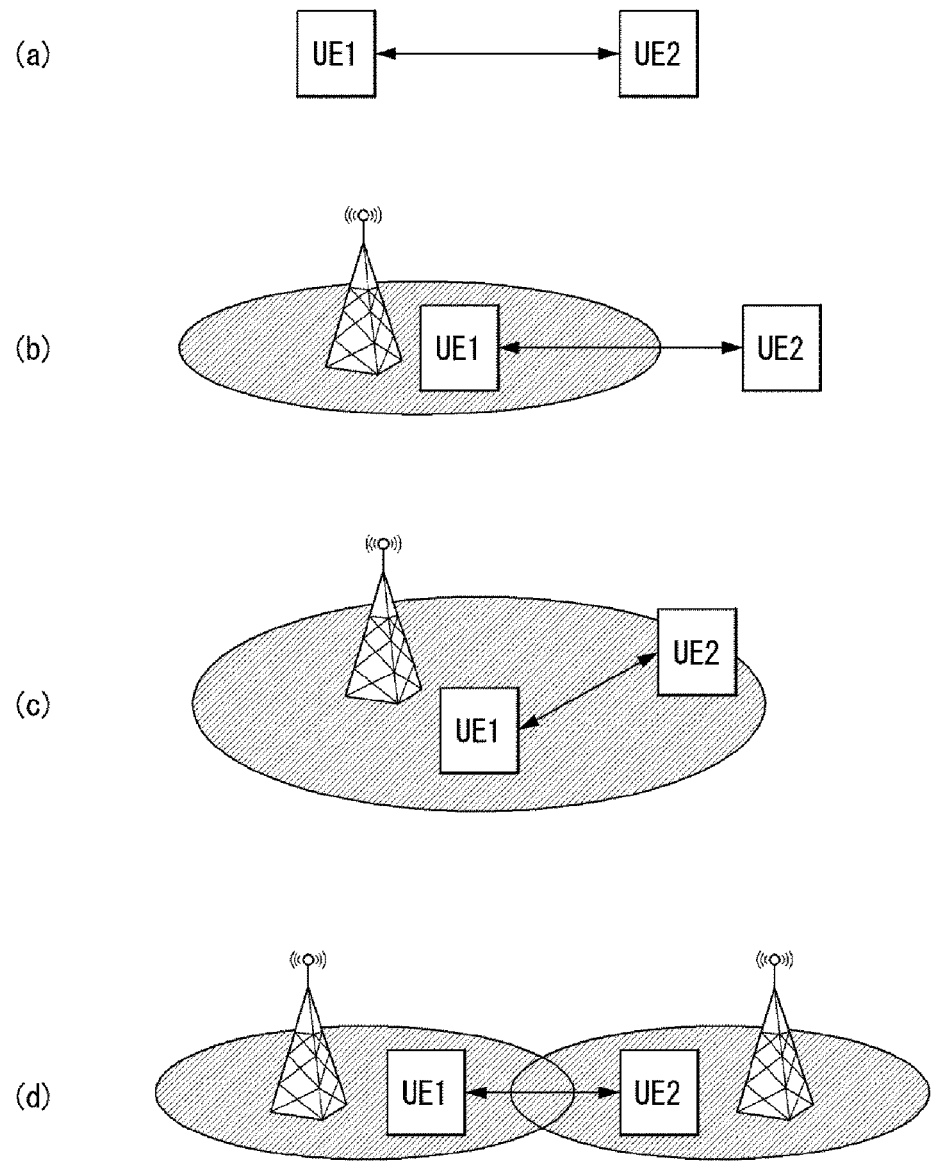

[FIG. 20]
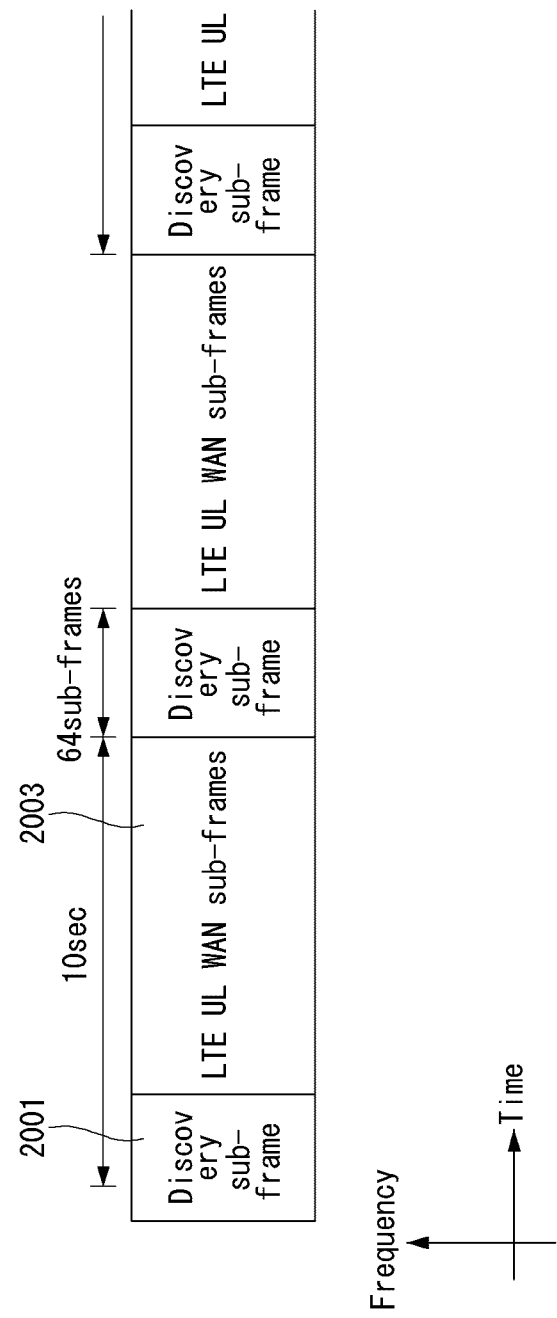

[FIG. 21]
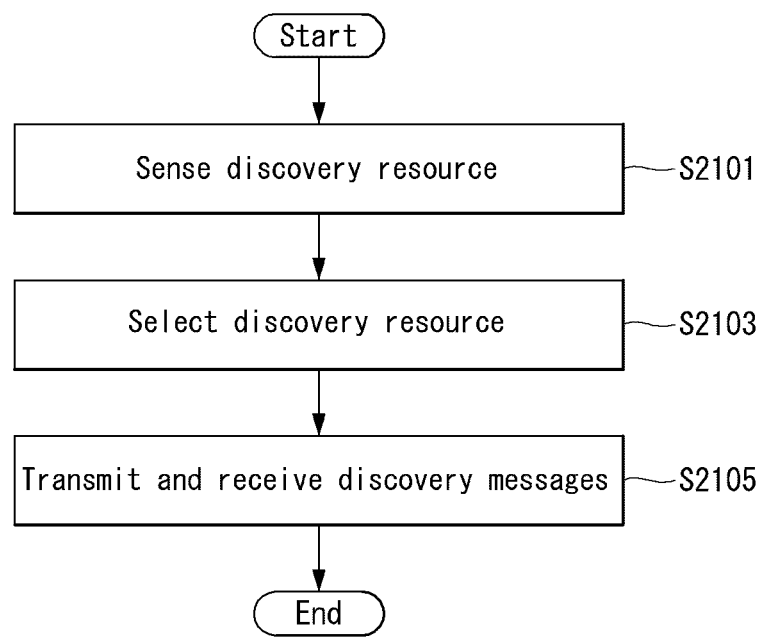

[FIG. 22]
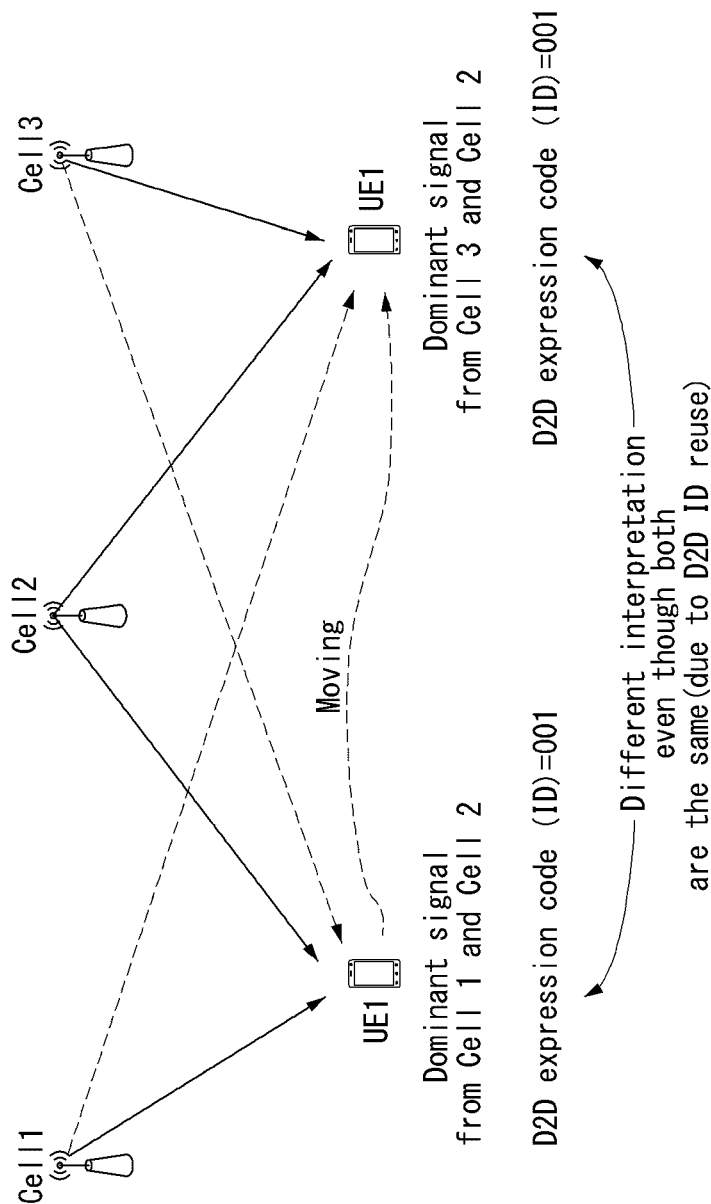

[FIG. 23]
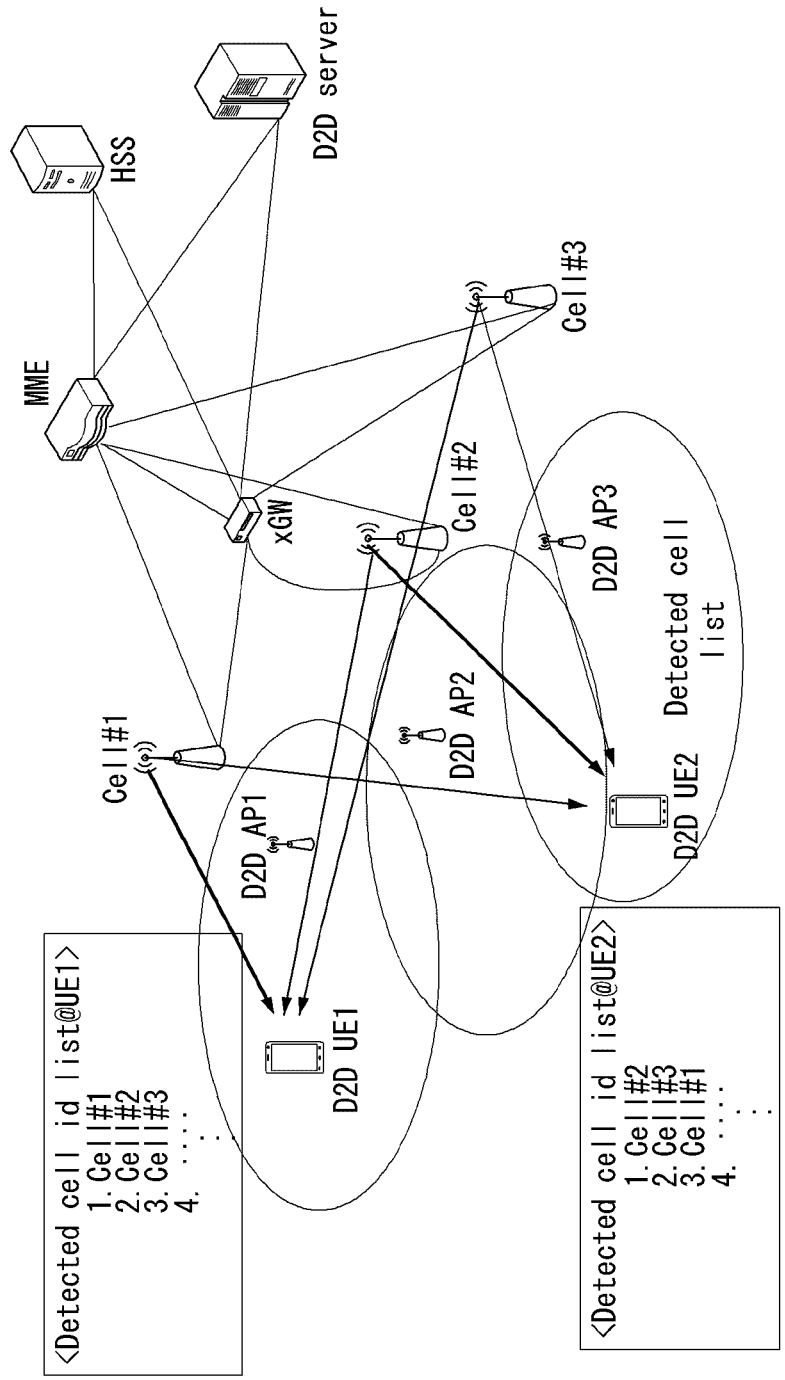

[FIG. 24]
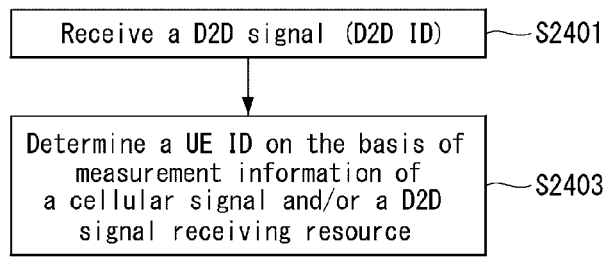
[FIG. 25]
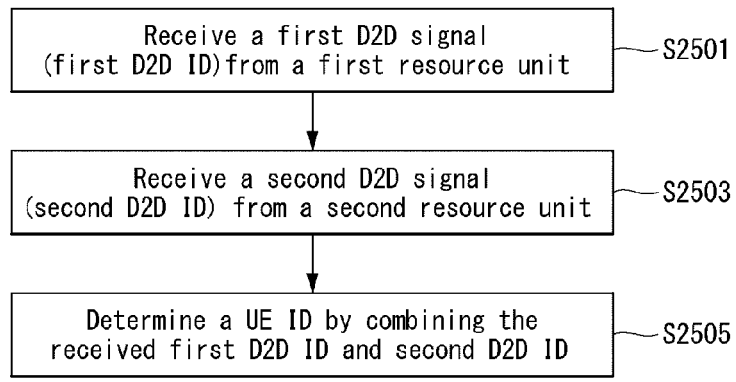
[FIG. 26]
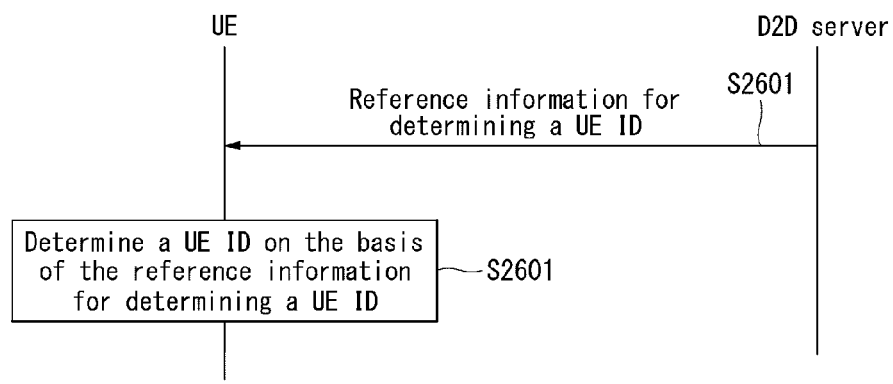

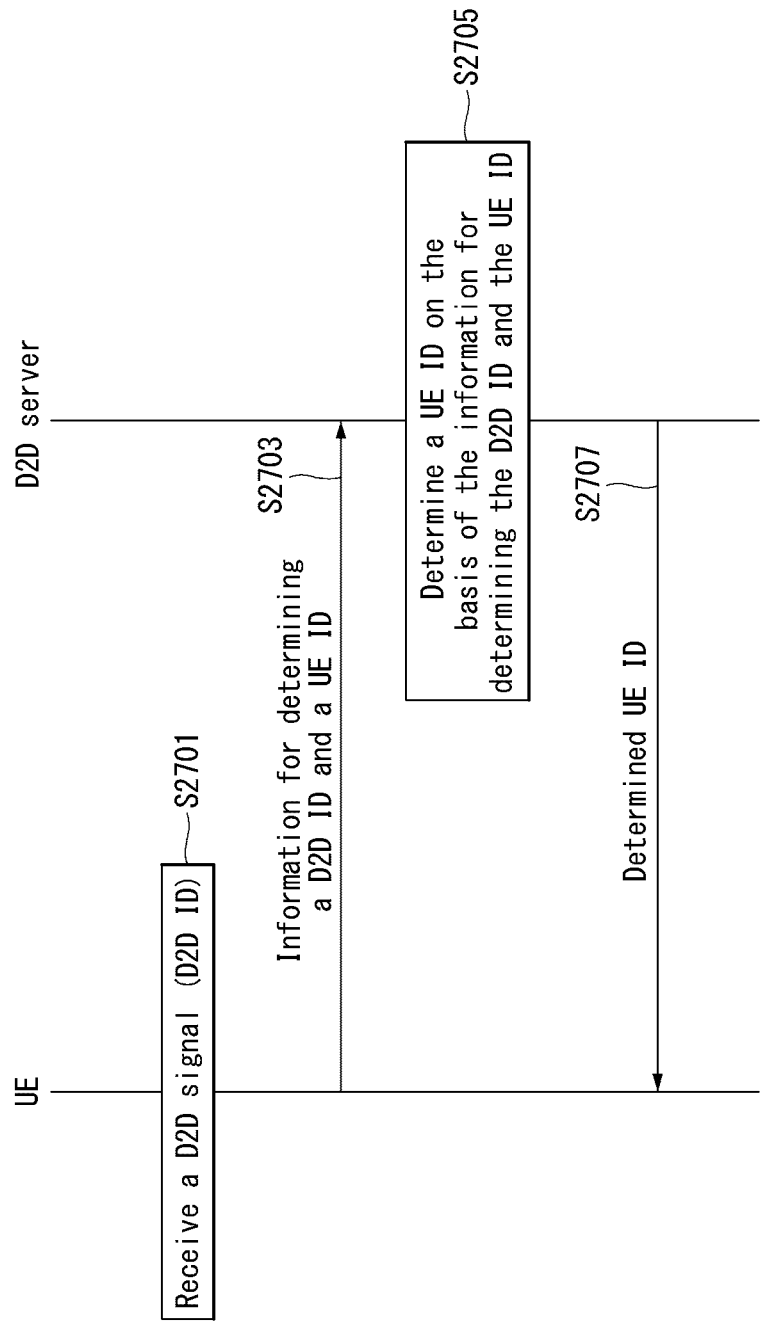
[FIG. 27]

[FIG. 28]
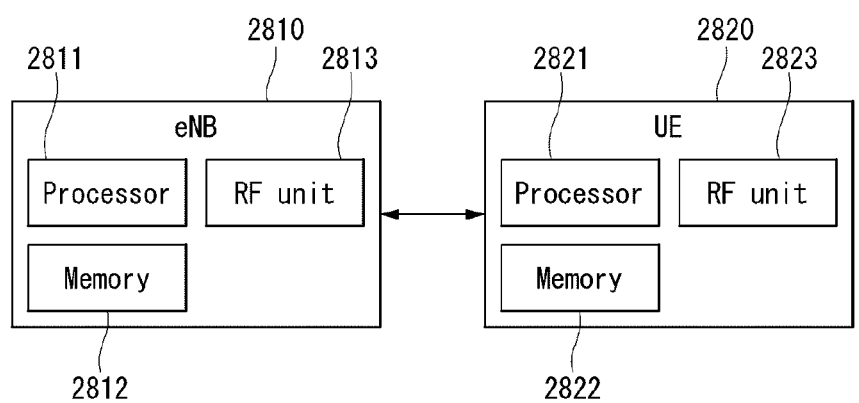

METHOD FOR DETERMINING TERMINAL IDENTIFIER IN WIRELESS COMMUNICATION SYSTEM SUPPORTING DEVICE-TO-DEVICE COMMUNICATION AND APPARATUS FOR SAME

CROSS REFERENCE TO RELATED APPLICATIONS

This application is the National Phase of PCT International Application No. PCT/KR2015/000617, filed on Jan. 21, 2015, which claims priority under 35 U.S.C. 119(e) to U.S. Provisional Application No. 61/929,919, filed on Jan. 21, 2014, all of which are hereby expressly incorporated by reference into the present application.

TECHNICAL FIELD

The present invention relates to a wireless communication system and more specifically a method for determining an identifier of a user equipment (UE) in a wireless communication system supporting communication between user equipments and an apparatus supporting the method.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

When a wireless communication system supporting device-to-device (D2D) communication assigns unique identifiers to a large number of user equipments, lengths of the identifiers become longer, which causes overhead on system implementation.

To solve the technical problem above, the present invention provides a method for determining a unique identifier for each UE on the basis of limited D2D identifiers in a wireless communication system supporting D2D communication.

The technical problems solved by the present invention are not limited to the above technical problems and those skilled in the art may understand other technical problems from the following description.

Technical Solution

According to one aspect of the present invention, a method for determining an identifier of a user equipment (UE) in a wireless communication system supporting device-to-device (D2D) communication comprises receiving, by a first UE, a D2D signal including a D2D identifier from a second UE; and determining, by the first UE, an identifier of the second UE on the basis of the received D2D identifier and measurement information of a cellular signal and/or information about resources in which the D2D signal is received.

According to another aspect of the present invention, a user equipment (UE) for determining an identifier of UE in a wireless communication system supporting device-to-device (D2D) communication comprises a Radio Frequency (RF) unit for transmitting and receiving a radio signal; and a processor, wherein the processor is configured to receive a D2D signal including a D2D identifier from a different UE and to determine an identifier of the second UE on the basis of the received D2D identifier and measurement information of a cellular signal and/or information about resources in which the D2D signal is received.

Preferably, the identifier of the second UE may be determined on the basis of an identifier of a cell exhibiting the highest strength or quality of the cellular signal.

Preferably, the identifier of the second UE may be determined on the basis of a combination of identifiers of cells arranged in the order of strength or quality of the cellular signal.

Preferably, the identifier of the second UE may be determined on the basis of time or frequency resource in which the D2D signal is received.

Preferably, the cellular signal may be one of a Primary Synchronization Signal (PSS), a Secondary Synchronization Signal (SSS), and a reference signal.

Preferably, the measurement information may be at least one of Reference Signal Received Power (RSRP), Reference Signal Received Quality (RSRQ), Receive Strength Signal Indicator (RSSI), Signal-to-Noise Ratio (SNR) or Signal to Interference plus Noise Ratio (SINR) measured by using the cellular signal.

Preferably, the method can further comprise receiving, by the UE, reference information for determining the UE ID from a D2D server, and the identifier of the second UE may be determined on the basis of reference information for determining the UE ID.

Preferably, the reference information for determining the UE ID may include a combination of an identifier of a cell exhibiting the highest strength or quality of the cellular signal and the D2D identifier; and mapping information of a UE identifier.

Preferably, the reference information for determining the UE ID may include a combination of an identifier of a cell arranged according to magnitude of a measurement value of strength or quality of the cellular signal and the D2D identifier; and mapping information of the UE identifier.

Preferably, the reference information for determining the UE ID may include a combination of a resource in which the D2D identifier is received and the D2D identifier; and mapping information of a UE identifier.

According to a yet another aspect of the present invention, a method for determining an identifier of a user equipment (UE) in a wireless communication system supporting device-to-device (D2D) communication comprises receiving, by a first UE, a D2D signal including a D2D identifier from a second UE; transmitting, by the first UE, the received D2D identifier and information for determining a UE identifier to a D2D server; and receiving, by the first UE, an identifier of the second UE from the D2D server.

According to a still another aspect of the present invention, a user equipment (UE) for determining identifiers of UEs in a wireless communication system supporting device-to-device (D2D) communication comprises a Radio Frequency (RF) unit for transmitting and receiving a radio signal; and a processor, wherein the processor is configured to receive a D2D signal including a D2D identifier from a different UE; to transmit the received D2D identifier and information for determining a UE identifier to a D2D server; and to receive an identifier of the second UE from the D2D server.

Preferably, the information for determining the UE identifier may include an identifier list of cells of which a cellular signal is detected and information about strength or quality of the cellular signal.

Preferably, the information for determining the UE identifier may include information about a resource in which the D2D signal is received.

Advantageous Effects

According to an embodiment of the present invention, unique identifiers can be assigned to the respective UEs in a wireless communication system supporting D2D communication by re-using limited D2D identifiers in time or spatial units.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 shows the structure of a radio frame in a wireless communication system to which an embodiment of the present invention may be applied.

FIG. 2 is a diagram illustrating a resource grid for one downlink slot in a wireless communication system to which an embodiment of the present invention may be applied.

FIG. 3 shows the structure of a downlink subframe in a wireless communication system to which an embodiment of the present invention may be applied.

FIG. 4 shows the structure of an uplink subframe in a wireless communication system to which an embodiment of the present invention may be applied.

FIG. 5 shows an example of a form in which PUCCH formats are mapped to the PUCCH region of the uplink physical resource block in a wireless communication system to which an embodiment of the present invention may be applied.

FIG. 6 shows the structure of a CQI channel in the case of a normal CP in a wireless communication system to which an embodiment of the present invention may be applied.

FIG. 7 shows the structure of an ACK/NACK channel in the case of a normal CP in a wireless communication system to which an embodiment of the present invention may be applied.

FIG. 8 shows an example in which five SC-FDMA symbols are generated and transmitted during one slot in a wireless communication system to which an embodiment of the present invention may be applied.

FIG. 9 shows an example of component carriers and a carrier aggregation in a wireless communication system to which an embodiment of the present invention may be applied.

FIG. 10 shows an example of the structure of a subframe according to cross-carrier scheduling in a wireless communication system to which an embodiment of the present invention may be applied.

FIG. 11 shows an example of transport channel processing for an UL-SCH in a wireless communication system to which an embodiment of the present invention may be applied.

FIG. 12 shows an example of a signal processing process in an uplink shared channel, that is, a transport channel, in a wireless communication system to which an embodiment of the present invention may be applied.

FIG. 13 shows the configuration of a known MIMO communication system.

FIG. 14 is a diagram showing a channel from a plurality of transmission antennas to a single reception antenna.

FIG. 15 illustrates a reference signal pattern mapped to a downlink resource block pair in a wireless communication system to which an embodiment of the present invention may be applied.

FIG. 16 illustrates an uplink subframe including sounding reference signal symbols in a wireless communication system to which an embodiment of the present invention may be applied.

FIG. 17 illustrates the segmentation of a relay node resource in a wireless communication system to which an embodiment of the present invention may be applied.

FIG. 18 is a diagram conceptually illustrating D2D communication in a wireless communication system to which an embodiment of the present invention may be applied.

FIG. 19 shows an example of various scenarios of D2D communication to which a method proposed in this specification may be applied.

FIG. 20 shows an example in which discovery resources have been allocated according to an embodiment of the present invention.

FIG. 21 is a simplified diagram illustrating a discovery process according to an embodiment of the present invention.

FIG. 22 illustrates a method for determining a UE identifier according to one embodiment of the present invention.

FIG. 23 illustrates a method for determining a UE identifier according to one embodiment of the present invention.

FIG. 24 illustrates a method for determining a UE identifier according to one embodiment of the present invention.

FIG. 25 illustrates a method for determining a UE identifier according to one embodiment.

FIG. 26 illustrates a method for determining a UE identifier according to one embodiment.

FIG. 27 illustrates a method for determining a UE identifier according to one embodiment.

FIG. 28 illustrates a block diagram of a wireless communication device according to one embodiment of the present invention.

MODE FOR INVENTION

Some embodiments of the present invention are described in detail with reference to the accompanying drawings. A detailed description to be disclosed along with the accompanying drawings are intended to describe some exemplary embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied. 3GPP LTE/LTE-A support a radio frame structure type 1 which may be applicable to Frequency Division Duplex (FDD) and a radio frame structure which may be applicable to Time Division Duplex (TDD).

FIG. 1(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| UL-DL configure-tion | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

The structure of a radio frame is only one example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDSCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Physical Uplink Control Channel (PUCCH)

The Uplink Control Information (UCI) transmitted through a PUCCH can include Scheduling Request (SR), HARQ ACK/NACK information, and downlink channel measurement information as shown below.

SR (Scheduling Request): used for requesting uplink UL-SCH resources. SR is transmitted by On-Off Keying (OOK) scheme.

HARQ ACK/NACK: a signal responding to a downlink data packet on a PDSCH. This signal indicates whether a downlink data packet has successfully received or not. ACK/NACK 1 bit is transmitted in response to a single downlink codeword while ACK/NACK 2 bits are transmitted in response to two downlink codewords.

CSI (Channel State Information): feedback information about a downlink channel. CSI can include at least one of a Channel Quality Indicator (CQI), a Rank Indicator (RI), a Precoding Matrix Indicator (PMI), and a Precoding Type Indicator (PTI). For each subframe, 20 bits are used to represent the CSI.

HARQ ACK/NACK information may be generated depending on whether a downlink data packet on a PDSCH has been successfully decoded. In an existing wireless communication system, 1 bit is transmitted as ACK/NACK information with respect to the transmission of downlink single codeword, and 2 bits are transmission as ACK/NACK information with respect to the transmission of downlink 2 codewords.

Channel measurement information denotes feedback information related to a Multiple Input Multiple Output (MIMO) scheme and may include a Channel Quality Indicator (CQI), a Precoding Matrix Index (PMI), and a Rank Indicator (RI). Such channel measurement information may be commonly called a CQI.

In order to transmit a CQI, 20 bits may be used in each subframe.

A PUCCH may be modulated using a Binary Phase Shift Keying (BPSK) scheme and a Quadrature Phase Shift Keying (QPSK) scheme. Control information for a plurality of UEs may be transmitted through a PUCCH. If Code Division Multiplexing (CDM) is performed in order to distinguish the signals of UEs from each other, a Constant Amplitude Zero Autocorrelation (CAZAC) sequence of a length 12 is mostly used. The CAZAC sequence has a characteristic in that a constant size (amplitude) is maintained in a time domain and a frequency domain. Accordingly, the CAZAC sequence has a property suitable for increasing coverage by lowering the Peak-to-Average Power Ratio (PAPR) or Cubic Metric (CM) of UE. Furthermore, ACK/NACK information about downlink data transmission transmitted through a PUCCH is covered using an orthogonal sequence or an Orthogonal Cover (OC).

Furthermore, control information transmitted through a PUCCH may be distinguished from each other using a cyclically shifted sequence having a different Cyclic Shift (CS) value. The cyclically shifted sequence may be generated by cyclically shifting a base sequence by a specific CS amount. The specific CS amount is indicated by a CS index. The number of available CSs may be different depending on delay spread of a channel. A variety of types of sequences may be used as the base sequence, and the CAZAC sequence is an example of the sequences.

Furthermore, the amount of control information that may be transmitted by UE in one subframe may be determined depending on the number of SC-FDMA symbols which may be used to send the control information (i.e., SC-FDMA symbols other than SC-FDMA symbols which are used to send a Reference Signal (RS) for the coherent detection of a PUCCH).

In a 3GPP LTE system, a PUCCH is defined as a total of 7 different formats depending on control information that is transmitted, a modulation scheme, and the amount of control information. The attributes of Uplink Control Information (UCI) transmitted according to each PUCCH format may be summarized as in Table 2 below.

TABLE 2

| PUCCH Format | Uplink Control Information (UCI) |
|---|---|
| Format 1 | Scheduling Request (SR) (not-modulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

The PUCCH format 1 is used for SR-only transmission. In the case of SR-only transmission, a not-modulated waveform is applied. This is described in detail later.

The PUCCH format 1a or 1b is used to send HARQ ACK/NACK. If HARQ ACK/NACK is solely transmitted in a specific subframe, the PUCCH format 1a or 1b may be used. Alternatively, HARQ ACK/NACK and an SR may be transmitted in the same subframe using the PUCCH format 1a or 1b.

PUCCCH format 2 is used for transmission of CQI, and PUCCH format 2a or 2b is used for transmission of CQI and HARQ ACK/NACK. In the case of extended CP, PUCCH format 2 may be used for transmission of CQI and HARQ ACK/NACK.

PUCCH format 3 is used for carrying an encoded UCI of 48 bits. PUCCH format 3 can carry HARQ ACK/NACK about a plurality of serving cells, SR (if exists), and a CSI report about one serving cell.

FIG. 5 shows an example of a form in which the PUCCH formats are mapped to the PUCCH region of the uplink physical resource block in a wireless communication system to which an embodiment of the present invention may be applied.

In FIG. 5, $N_{RB}^{UL}$ is indicative of the number of RBs in uplink, and $0, 1, \ldots, N_{RB}^{UL}-1$ means the number of physical RBs. Basically, a PUCCH is mapped to both edges of an uplink frequency block. As shown in FIG. 5, the PUCCH format 2/2a/2b is mapped to a PUCCH region indicated by m=0, 1. This may represent that the PUCCH format 2/2a/2b is mapped to RBs located at a band edge. Furthermore, the PUCCH format 2/2a/2b and the PUCCH format 1/1a/1b may be mixed and mapped to a PUCCH region indicated by m=2. Furthermore, the PUCCH format 1/1a/1b may be mapped to a PUCCH region indicated by m=3, 4, 5. UEs within a cell may be notified of the number $N_{RB}^{(2)}$ of PUCCH RBs which may be used by the PUCCH format 2/2a/2b through broadcasting signaling.

The PUCCH format 2/2a/2b is described below. The PUCCH format 2/2a/2b is a control channel for transmitting channel measurement feedback (i.e., a CQI, a PMI, and an RI).

The report cycle of channel measurement feedback (hereinafter commonly called "CQI information") and a frequency unit (or frequency resolution) to be measured may be controlled by an eNB. In a time domain, a periodic or aperiodic CQI report may be supported. The PUCCH format 2 may be used for a periodic report, and a PUSCH may be used for an aperiodic report. In the case of an aperiodic report, an eNB may instruct UE to carry an individual CQI report on a resource scheduled to transmit uplink data.

FIG. 6 shows the structure of a CQI channel in the case of a normal CP in a wireless communication system to which an embodiment of the present invention may be applied.

The SC-FDMA symbols 1 and 5 (i.e., the second and the sixth symbols) of the SC-FDMA symbols 0 to 6 of one slot are used to transmit a demodulation reference signal (DMRS), and the remaining SC-FDMA symbols of the SC-FDMA symbols 0 to 6 of the slot may be used to CQI information. Meanwhile, in the case of an extended CP, one SC-FDMA symbol (SC-FDMA symbol 3) is used for DMRS transmission.

In the PUCCH format 2/2a/2b, modulation by a CAZAC sequence is supported, and a QPSK-modulated symbol is multiplied by a CAZAC sequence of a length 12. A Cyclic Shift (CS) of the sequence is changed between a symbol and a slot. Orthogonal covering is used for a DMRS.

A reference signal (DMRS) is carried on 2 SC-FDMA symbols that belong to 7 SC-FDMA symbols included in one slot and that is spaced at 3 SC-FDMA symbols. CQI information is carried on the remaining 5 SC-FDMA symbols of the 7 SC-FDMA symbols. Two RSs are used in one slot in order to support high-speed UE. Furthermore, UEs are distinguished from each other using Cyclic Shift (CS) sequences. CQI information symbols are modulated into all SC-FDMA symbols and transferred. The SC-FDMA symbols consist of one sequence. That is, UE modulates a CQI using each sequence and sends the CQI.

The number of symbols which may be transmitted in one TTI is 10, and the modulation of CQI information is determined up to QPSK. If QPSK mapping is used for an SC-FDMA symbol, a CQI value of 10 bits may be carried on one slot because a CQI value of 2 bits may be carried on the SC-FDMA symbol. Accordingly, a CQI value having a maximum of 20 bits may be carried on one subframe. Frequency domain spread code is used to spread CQI information in a frequency domain.

A CAZAC sequence (e.g., ZC sequence) of a length 12 may be used as the frequency domain spread code. Control channels may be distinguished from each other by applying CAZAC sequences having different cyclic shift values. IFFT is performed on frequency domain-spread CQI information.

12 different UEs may be subjected to orthogonal multiplexing on the same PUCCH RB by 12 cyclic shifts having the same interval. In the case of a normal CP, a DMRS sequence on the SC-FDMA symbols 1 and 5 (on an SC-FDMA symbol 3 in the case of an extended CP) are similar to a CQI signal sequence on a frequency domain, but modulation, such as CQI information, is not applied to the DMRS sequence.

UE may be semi-statically configured by higher layer signaling so that it periodically reports different CQI, PMI and RI Types on PUCCH resources indicated by PUCCH resource indices $n_{PUCCH}^{(1,\tilde{p})}$, $n_{PUCCH}^{(2,\tilde{p})}$, and $n_{PUCCH}^{(3,\tilde{p})}$. In this case, the and PUCCH resource index $n_{PUCCH}^{(2,\tilde{p})}$ is information indicative of a PUCCH region that is used to transmit the PUCCH format 2/2a/2b and the value of a Cyclic Shift (CS) to be used.

Hereinafter, the PUCCH format 1a and 1b is described below.

In the PUCCH format 1a/1b, a symbol modulated using a BPSK or QPSK modulation scheme is multiplied by a CAZAC sequence of a length 12. For example, the results of a modulation symbol d(0) by a CAZAC sequence r(n) (n=0, 1, 2, ..., N-1) of a length N become y(0), y(1), y(2), ..., y(N-1). The symbols y(0), ..., y(N-1) may be called a block of symbols. After the modulation symbol is multiplied by the CAZAC sequence, block-wise spread using an orthogonal sequence is applied.

A Hadamard sequence of a length 4 is used for common ACK/NACK information, and a Discrete Fourier Transform (DFT) sequence of a length 3 is used for shortened ACK/NACK information and a reference signal.

In the case of an extended CP, a Hadamard sequence of a length 2 is used in a reference signal.

FIG. 7 shows the structure of an ACK/NACK channel in the case of a normal CP in a wireless communication system to which an embodiment of the present invention may be applied.

FIG. 7 illustrates a PUCCH channel structure for transmitting HARQ ACK/NACK without a CQI.

A Reference Signal (RS) is carried on 3 contiguous SC-FDMA symbol that belong to 7 SC-FDMA symbols included in one slot and that are placed in a middle portion, and an ACK/NACK signal is carried on the remaining 4 SC-FDMA symbols of the 7 SC-FDMA symbols.

Meanwhile, in the case of an extended CP, an RS may be carried on 2 contiguous symbols placed in the middle of one slot. The number and positions of symbols used in an RS may be different depending on control channels, and the number and positions of symbols used in an ACK/NACK signal associated with the control channels may be changed depending on the number and positions of symbols used in the RS.

ACK information (not-scrambled state) of 1 bit and 2 bits may be represented as one HARQ ACK/NACK modulation symbol using respective BPSK and QPSK modulation schemes. Positive ACK (ACK) may be encoded as "1", and negative ACK (NACK) may be encoded as "0".

When a control signal is to be transmitted within an allocated bandwidth, two-dimensional spreading is applied in order to increase multiplexing capacity. That is, in order to increase the number of UEs or the number of control channels that may be multiplexed, frequency domain spreading and time domain spreading are used at the same time.

In order to spread an ACK/NACK signal in a frequency domain, a frequency domain sequence is used as a base sequence. A Zadoff-Chu (ZC) sequence which is one of CAZAC sequences, may be used as the frequency domain sequence. For example, by applying a different Cyclic Shift (CS) to a ZC sequence which is a base sequence, different UEs or different control channels may be multiplexed. The number of CS resources supported in a SC-FDMA symbol for PUCCH RBs for transmitting HARQ ACK/NACK is configured by a cell-specific upper layer signaling parameter shift $\Delta_{shift}^{PUCCH}$.

An ACK/NACK signal spread in a frequency domain is spread in a time domain using orthogonal spreading code. A Walsh-Hadamard sequence or DFT sequence may be used as the orthogonal spreading code. For example, an ACK/NACK signal may be spread for 4 symbols using an orthogonal sequence w0, w1, w2, or w3 of a length 4.

Furthermore, an RS is also spread using an orthogonal sequence of a length 3 or length 2. This is called Orthogonal Covering (OC).

A plurality of UEs may be multiplexed using a Code Division Multiplexing (CDM) method using CS resources in a frequency domain and OC resources in a time domain, such as those described above. That is, ACK/NACK information and RSs of a large number of UEs may be multiplexed on the same PUCCH RB.

The number of spreading code supported for ACK/NACK information is restricted by the number of RS symbols with respect to such time domain spreading CDM. That is, the multiplexing capacity of an RS is smaller than the multiplexing capacity of ACK/NACK information because the number of SC-FDMA symbols for RS transmission is smaller than the number of SC-FDMA symbols for ACK/NACK information transmission.

For example, in the case of a normal CP, ACK/NACK information may be transmitted in 4 symbols. 3 pieces of orthogonal spreading code not 4 are used for ACK/NACK information. The reason for this is that only 3 pieces of orthogonal spreading code may be used for an RS because the number of symbols for RS transmission is limited to 3. In case that 3 symbols of one slot may be used for RS transmission and 4 symbols of the slot may be used for ACK/NACK information transmission in a subframe of a normal CP, for example, if 6 Cyclic Shifts (CSs) may be used in a frequency domain and 3 Orthogonal Cover (OC) resources may be used in a time domain, HARQ ACK from a total of 18 different UEs may be multiplexed within one PUCCH RB. In case that 2 symbols of one slot are used for RS transmission and 4 symbols of one slot are used for ACK/NACK information transmission in a subframe of an extended CP, for example, if 6 CSs may be used in a frequency domain and 2 OC resources may be used in a time domain, HARQ ACK from a total of 12 different UEs may be multiplexed within one PUCCH RB.

The PUCCH format 1 is described below. A Scheduling Request (SR) is transmitted in such a way as to make a request or does not make a request that UE is scheduled. An SR channel reuses an ACK/NACK channel structure in the POOCH format 1a/1b and consists of an On-Off Keying (OKK) method based on an ACK/NACK channel design. An RS is not transmitted in the SR channel. Accordingly, a sequence of a length 7 is used in the case of a normal CP, and a sequence of a length 6 is used in the case of an extended CP. Different cyclic shifts or orthogonal covers may be allocated to an SR and ACK/NACK. That is, in order to send a positive SR, UE sends HARQ ACK/NACK through a resource allocated for the SR. In order to send a negative SR, UE sends HARQ ACK/NACK through a resource allocated for ACK/NACK.

An enhanced-PUCCH (e-PUCCH) format is described below. An e-PUCCH may correspond to the PUCCH format 3 of an LTE-A system. A block spreading scheme may be applied to ACK/NACK transmission using the PUCCH format 3.

Unlike in the existing PUCCH format 1 series or 2 series, the block spreading scheme is a method of modulating control signal transmission using an SC-FDMA method. As shown in FIG. 8, a symbol sequence may be spread in a time domain using Orthogonal Cover Code (OCC) and transmitted. By using OCC, the control signals of a plurality of UEs may be multiplexed on the same RB. In the case of the PUCCH format 2, one symbol sequence is transmitted in a time domain, and the control signals of a plurality of UEs are multiplexed using a Cyclic Shift (CS) of a CAZAC sequence. In contrast, in the case of a block spreading-based PUCCH format (e.g., the PUCCH format 3), one symbol sequence is transmitted in a frequency domain, and the control signals of a plurality of UEs are multiplexed using time domain spreading using OCC.

FIG. 8 shows an example in which 5 SC-FDMA symbols are generated and transmitted during one slot in a wireless communication system to which an embodiment of the present invention may be applied.

FIG. 8 shows an example in which 5 SC-FDMA symbols (i.e., a data part) are generated using OCC of a length=5 (or SF=5) in one symbol sequence during 1 slot and transmitted. In this case, 2 RS symbols may be used during the 1 slot.

In the example of FIG. 8, the RS symbols may be generated from a CAZAC sequence to which a specific CS value has been applied and may be transmitted in a form in which a specific OCC may be applied (or multiplied) to a plurality of RS symbols. Furthermore, in the example of FIG. 8, assuming that 12 modulation symbols are used in each OFDM symbol (or SC-FDMA symbol) and each of the modulation symbols is generated by QPSK, a maximum number of bits capable of being transmitted in one slot are 12×2=24 bits. Accordingly, a total number of bits capable of being transmitted in 2 slots are 48 bits. As described above, if a PUCCH channel structure using a block spreading method is used, control information having an extended size compared to the existing PUCCH format 1 series and 2 series can be transmitted.

General Carrier Aggregation

A communication environment taken into consideration in embodiments of the present invention includes a multi-carrier support environment. That is, a multi-carrier system or Carrier Aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between contiguous carriers and an aggregation between discontiguous (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a Primary Cell (PCell) and a Secondary Cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An Evolved Universal Terrestrial Radio Access Network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnectionReconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a Primary Component Carrier (PCC) may be used as the same meaning as a PCell, and a Secondary Component Carrier (SCC) may be used as the same meaning as an SCell.

FIG. 9 shows an example of component carriers and a carrier aggregation in a wireless communication system to which an embodiment of the present invention may be applied.

FIG. 9a shows the structure of a single carrier used in an LTE system. A component carrier includes a DL CC and an UL CC. One component carrier may have a frequency range of 20 MHz.

FIG. 9b shows the structure of a carrier aggregation used in an LTE-A system. FIG. 9b shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by System Information Block Type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

Cross-Carrier Scheduling

In a carrier aggregation system, there are two methods, that is, a self-scheduling method and a cross-carrier scheduling method form the point of view of scheduling for a carrier or a serving cell. Cross-carrier scheduling may also be called cross-component carrier scheduling or cross-cell scheduling.

Cross-carrier scheduling means that a PDCCH (DL grant) and a PDSCH are transmitted in different DL CCs or that a PDSCH transmitted according to a PDCCH (UL grant) transmitted in a DL CC is transmitted through an UL CC different from an UL CC that is linked to the DL CC through which the UL grant has been received.

Whether cross-carrier scheduling will be performed may be activated or deactivate in a UE-specific way, and each UE may be notified through high layer signaling (e.g., RRC signaling) semi-statically.

If cross-carrier scheduling is activated, there is a need for a Carrier Indicator Field (CIF) providing notification that a PDSCH/PUSCH indicated by a PDCCH is transmitted through which DL/UL CC. For example, a PDCCH may allocate a PDSCH resource or PUSCH resource to any one of a plurality of component carriers using a CIF. That is, if a PDCCH on a DL CC allocates a PDSCH or PUSCH resource to one of multi-aggregated DL/UL CCs, a CIF is configured. In this case, a DCI format of LTE-A Release-8 may be extended according to the CIF. In this case, the configured CIF may be fixed to a 3-bit field, and the position of the configured CIF may be fixed regardless of the size of the DCI format. Furthermore, a PDCCH structure (resource mapping based on the same coding and the same CCE) of LTE-A Release-8 may be reused.

In contrast, if a PDCCH on a DL CC allocates a PDSCH resource on the same DL CC or allocates a PUSCH resource on a single-linked UL CC, a CIF is not configured. In this case, the same PDCCH structure (resource mapping based on the same coding and the same CCE) and DCI format as those of LTE-A Release-8 may be used.

If cross-carrier scheduling is possible, UE needs to monitor a PDCCH for a plurality of pieces of DCI in the control region of a monitoring CC based on a transmission mode and/or bandwidth corresponding to each CC.

Accordingly, there is a need for the configuration of a search space and PDCCH monitoring capable of supporting such monitoring.

In a carrier aggregation system, a UE DL CC set is indicative of a set of DL CCs scheduled so that UE receives a PDSCH. A UE UL CC set is indicative of a set of UL CCs scheduled so that UE transmits a PUSCH. Furthermore, a PDCCH monitoring set is indicative of a set of one or more DL CCs for performing PDCCH monitoring. A PDCCH monitoring set may be the same as a UE DL CC set or may be a subset of a UE DL CC set. A PDCCH monitoring set may include at least one of DL CCs within a UE DL CC set. Alternatively, a PDCCH monitoring set may be separately defined regardless of a UE DL CC set. DL CCs included in a PDCCH monitoring set may be configured so that self-scheduling for a linked UL CC is always possible. Such a UE DL CC set, UE UL CC set, and PDCCH monitoring set may be configured in a UE-specific, UE group-specific, or cell-specific way.

If cross-carrier scheduling is deactivated, it means that a PDCCH monitoring set is always the same as UE DL CC set. In this case, there is no indication, such as separate signaling for a PDCCH monitoring set. However, if cross-carrier scheduling is activated, a PDCCH monitoring set may be defined in a UE DL CC set. That is, in order to schedule a PDSCH or PUSCH for UE, an eNB transmits a PDCCH through a PDCCH monitoring set only.

FIG. 10 shows an example of the structure of a subframe according to cross-carrier scheduling in a wireless communication system to which an embodiment of the present invention may be applied.

FIG. 10 shows an example in which 3 DL CCs are aggregated in a DL subframe for LTE-A UE and a DL CC "A" has been configured as a PDCCH monitoring DL CC. IF a CIF is not used, each DL CC may send a PDCCH for scheduling its PDSCH without a CIF. In contrast, if a CIF is used through higher layer signaling, only the single DL CC "A" may send its PDSCH or a PDCCH for scheduling a PDSCH of a different CC using the CIF. In this case, the DL CCs "B" and "C" not configured as PDCCH monitoring DL CCs do not send a PDCCH.

General ACK/NACK Multiplexing Method

In a situation in which UE has to simultaneously send a plurality of ACK/NACKs corresponding to a plurality of data units received from an eNB, an ACK/NACK multiplexing method based on the selection of a PUCCH resource may be taken into consideration in order to maintain the single frequency characteristic of an ACK/NACK signal and to reduce ACK/NACK transmission power.

The content of ACK/NACK responses for a plurality of data units, together with ACK/NACK multiplexing, is identified by a combination of a PUCCH resource used in actual ACK/NACK transmission and the resource of QPSK modulation symbols.

For example, if one PUCCH resource sends 4 bits and a maximum of 4 data units are transmitted, ACK/NACK results may be identified in an eNB as in Table 3 below.

TABLE 3

| HARQ-ACK (0), HARQ-ACK (1), HARQ-ACK (2), HARQ-ACK (3) | $n_{PUCCH}^{(1)}$ | b (0), b (1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX, | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 3, HARQ-ACK (i) is indicative of ACK/NACK results for an i-th data unit. In Table 3, discontinuous transmission (DTX) means that there is no data unit transmitted for a corresponding HARQ-ACK(i) or that UE does not detect a data unit corresponding to the HARQ-ACK(i).

In accordance with Table 3, a maximum of 4 PUCCH resources $n_{PUCCH,0}^{(1)}$, $n_{PUCCH,1}^{(1)}$, $n_{PUCCH,2}^{(1)}$, and $n_{PUCCH,3}^{(1)}$ are present, and b(0), b(1) has 2 bits transmitted using a selected PUCCH.

For example, if UE successfully receives all of the 4 data units, the UE sends 2 bits (1, 1) using the PUCCH resource $n_{PUCCH,1}^{(1)}$.

If UE fails in decoding in first and third data units and succeed in decoding in second and fourth data units, the UE sends bits (1, 0) using the PUCCH resource $n_{PUCCH,3}^{(1)}$.

In the selection of an ACK/NACK channel, if at least one ACK is present, NACK and DTX are coupled. The reason for this is that all of ACK/NACK states are unable to be represented using a combination of a reserved PUCCH resource and a QPSK symbol. If ACK is not present, however, DTX is decoupled from NACK.

In this case, a PUCCH resource linked to a data unit corresponding to one clear NACK may be reserved in order to send a signal for a plurality of ACKs/NACKs.

PDCCH Validation for Semi-Persistent Scheduling

Semi-Persistent Scheduling (SPS) is a scheduling method for allocating resources to specific UE so that the resources continue to be maintained during a specific time interval.

If a specific amount of data is transmitted during a specific time as in a Voice over Internet Protocol (VoIP), the waste of control information can be reduced using the SPS method because the control information does not need to be transmitted at each data transmission interval for resource allocation. In a so-called SPS method, a time resource area in which resources may be allocated is first allocated to UE.

In this case, in the semi-persistent allocation method, a time resource area allocated to specific UE may be configured to have a cycle. Next, the allocation of time-frequency resources is completed by allocating a frequency resource area, if necessary. The allocation of a frequency resource area as described above may be called so-called activation. If the semi-persistent allocation method is used, resource allocation is maintained by one signaling during a specific period. Accordingly, signaling overhead can be reduced because resource allocation does not need to be repeatedly performed.

Thereafter, if resource allocation for the UE is not required, signaling for releasing the frequency resource allocation may be transmitted from an eNB to the UE. The release of the allocation of a frequency resource area as described above may be called deactivation.

In current LTE, for SPS for uplink and/or downlink, first, UE is notified of that SPS transmission/reception need to be performed in what subframes through Radio Resource Control (RRC) signaling. That is, a time resource of time-frequency resources allocated for SPS is first designated through RRC signaling. In order to notify the UE of available subframes, for example, the UE may be notified of the cycle and offset of a subframe. However, the UE does not immediately perform transmission/reception according to SPS although it has received RRC signaling because only the time resource area is allocated to the UE through RRC signaling. The allocation of the time-frequency resources is completed by allocating a frequency resource area, if necessary. The allocation of a frequency resource area as described above may be called activation, and the release of the allocation of a frequency resource area may be called deactivation.

Accordingly, the UE receives a PDCCH indicative of activation, allocates a frequency resource based on RB allocation information included in the received PDCCH, and starts to perform transmission/reception based on a subframe cycle and offset allocated through RRC signaling by applying a modulation scheme and coding rate according to Modulation and Coding Scheme (MCS) information.

Next, when receiving a PDCCH indicative of deactivation from an eNB, the UE stops the transmission/reception. When a PDCCH indicative of activation or reactivation is received after the transmission/reception is stopped, the UE resumes transmission/reception using a subframe cycle and offset allocated through RRC signaling using RBs and an MCS designated in the corresponding PDCCH. That is, the allocation of time resources is performed through RRC signaling, but the transmission/reception of actual signals may be performed after a PDCCH indicative of the activation and reactivation of SPS is received. The stop of signal transmission/reception is performed after a PDCCH indicative of the deactivation of SPS is received.

If the following conditions are all satisfied, the UE may validate a PDCCH including an SPS indication. First, CRC parity bits added for PDCCH payload need to be scrambled with an SPS C-RNTI. Second, a New Data Indicator (NDI) field needs to be set to 0. In this case, in the case of the DCI formats 2, 2A, 2B, and 2C, an NDI field is indicative of one of activated transport blocks.

Furthermore, the validation of each field used in the DCI format is completed when each field is set based on Table 4 and Table 5 below. When such a validation is completed, the UE recognizes the received DCI information as being valid SPS activation or deactivation (or release). In contrast, if the validation is not completed, the UE recognizes that non-matching CRC is included in a received DCI format.

Table 4 illustrates fields for PDCCH validation indicative of SPS activation.

TABLE 4

| | DCI FORMAT 0 | DCI FORMAT 1/1A | DCI FORMAT 2/2A/2B |
|---|---|---|---|
| TPC command for scheduled PUSCH | set to "00" | N/A | N/A |
| Cyclic shift DMRS | set to "000" | N/A | N/A |
| MCS and redundancy version | MSB is set to "0" | N/A | N/A |
| HARQ process number | N/A | FDD: set to "000" TDD: set to "0000" | FDD: set to "000" TDD: set to "0000" |
| MCS | N/A | MSB is set to "0" | For an enabled transport block: MSB is set to "0" |
| Redundancy version | N/A | set to "00" | For the enabled transport block: set to "00" |

Table 5 illustrates fields for PDCCH validation indicative of SPS deactivation (or release).

TABLE 5

| | DCI format 0 | DCI format 1A |
|---|---|---|
| TPC command for scheduled PUSCH | set to "00" | N/A |
| Cyclic shift DMRS | set to "000" | N/A |
| MCS and redundancy version | set to "11111" | N/A |
| Resource block assignment and hopping resource allocation | Set to all "1"s | N/A |
| HARQ process number | N/A | FDD: set to "000" TDD: set to "0000" |
| MCS | N/A | set to "11111" |
| Redundancy version | N/A | set to "00" |
| Resource block assignment | N/A | Set to all "1"s |

If a DCI format is indicative of SPS downlink scheduling activation, a TPC command value for a PUCCH field may be used an index indicative of 4 PUCCH resource values set by a higher layer.

PUCCH Piggybacking

FIG. 11 shows an example of transport channel processing for an UL-SCH in a wireless communication system to which an embodiment of the present invention may be applied.

In a 3GPP LTE system (=E-UTRA, Rel. 8), in the case of UL, in order to efficiently use the power amplifier of UE, a Peak-to-Average Power Ratio (PAPR) characteristic or Cubic Metric (CM) characteristic affecting performance of the power amplifier are set to maintain good single carrier transmission. That is, in the case of PUSCH transmission in an existing LTE system, the single carrier characteristic of data may be maintained through DFT-precoding. In the case of PUCCH transmission, a single carrier characteristic may be maintained by carrying information on a sequence having a single carrier characteristic and sending the information. However, if DFT-precoded data is discontiguously allocated based on a frequency axis, or a PUSCH and a PUCCH are transmitted at the same time, such a single carrier characteristic is not maintained. Accordingly, if PUSCH transmission is to be performed in the same subframe as that of PUCCH transmission as in FIG. 11, Uplink Control Information (UCI) information to be transmitted through a PUCCH is transmitted (piggybacked) along with data through a PUSCH in order to maintain the single carrier characteristic.

In a subframe in which a PUSCH is transmitted, a method of multiplexing Uplink Control Information (UCI) (a CQI/PMI, HARQ-ACK, an RI, etc.) with a PUSCH region is used because existing LTE UE is unable to send a PUCCH and a PUSCH at the same time as described above.

For example, if a Channel Quality Indicator (CQI) and/or a Precoding Matrix Indicator (PMI) are to be transmitted in a subframe allocated to send a PUSCH, UL-SCH data and the CQI/PMI may be multiplexed prior to DFT-spreading and may be transmitted along with control information and data. In this case, the UL-SCH data is subjected to rate matching by taking the CQI/PMI resources into consideration. Furthermore, a method of puncturing the UL-SCH data into control information, such as HARQ ACK, and an RI, and multiplexing the results with a PUSCH region is used.

FIG. 12 shows an example of a signal processing process in an uplink shared channel, that is, a transport channel, in a wireless communication system to which an embodiment of the present invention may be applied.

Hereinafter, a signal processing process for an uplink shared channel (hereinafter called an "UL-SCH") may be applied to one or more transport channels or control information types.

Referring to FIG. 12, an UL-SCH transfers data to a coding unit in the form of a Transport Block (TB) once for each Transmission Time Interval (TTI).

CRC parity bits $p_0, p_1, p_2, p_3, \ldots, p_{L-1}$ are attached to the bits $a_0, a_1, a_2, a_3, \ldots, a_{A-1}$ of the transport block received from a higher layer at step S120. In this case, A is the size of the transport block, and L is the number of parity bits. The input bits to which the CRC parity bits have been attached are $b_0, b_1, b_2, b_3, \ldots, b_{B-1}$. In this case, B is indicative of the number of bits of the transport block including the CRC parity bits.

The input bits $b_0, b_1, b_2, b_3, \ldots, b_{B-1}$ are segmented into several Code Blocks (CBs) based on the TB size. A CRC is attached to the segmented several CBs at step S121. Bits after the segmentation of the CBs and the attachment of the CRC are $c_{r0}, c_{r1}, c_{r2}, c_{r3}, \ldots, c_{r(K_r-1)}$. In this case, r is a CB number $(r=0, \ldots, C-1)$, and $K_r$ is the number of bits according to a CB r. Furthermore, C is a total number of CBs.

Next, channel coding is performed at step S122. Output bits after the channel coding are $d_{r0}^{(i)}, d_{r1}^{(i)}, d_{r2}^{(i)}, d_{r3}^{(i)}, \ldots, d_{r(D_r-1)}^{(i)}$ In this case, i is a coded stream index and may have a value 0, 1, or 2 value. $D_r$ is the number of bits of the i-th-coded stream for the CB r. r is a CB number $(r=0, \ldots, C-1)$, and C a total number of CBs. Each CB may be coded by turbo coding.

Next, rate matching is performed at step S123. Bits after the rate matching are $e_{r0}, e_{r1}, e_{r2}, e_{r3}, \ldots, e_{r(E_r-1)}$. In this case, r is a CB number $(r=0, \ldots, C-1)$, and C is a total number of CBs. $E_r$ is the number of bits of a r-th code block that has been subjected to rate matching.

Next, a concatenation between the CBs is performed again at step S124. Bits after the concatenation of the CBs are $f_0, f_1, f_2, f_3, \ldots, f_{G-1}$. In this case, G is a total number of coded bits for transmission. When control information is multiplexed with UL-SCH transmission, the number of bits used for control information transmission is not included.

Meanwhile, when control information is transmitted in a PUSCH, channel coding is independently performed on a CQI/PMI, an RI, and ACK/NACK, that is, the control information, at steps S126, S127, and S128. The pieces of control information have different coding rates because different coded symbols are allocated for the transmission of the control information.

In Time Division Duplex (TDD), ACK/NACK feedback mode supports two types of ACK/NACK bundling mode and ACK/NACK multiplexing mode by the configuration of a higher layer. For ACK/NACK bundling, ACK/NACK information bits include 1 bit or 2 bits. For ACK/NACK multiplexing, ACK/NACK information bits include 1 bit to 4 bits.

After the concatenation between the CBs at step S124, the multiplexing of the coded bits $f_0, f_1, f_2, f_3, \ldots, f_{G-1}$ of the UL-SCH data and the coded bits $q_0, q_1, q_2, q_3, \ldots, q_{N_L \cdot Q_{CQI}-1}$ of the CQI/PMI are performed at step S125. The results of the multiplexing of the UL-SCH data and the CQI/PMI are $g_0, g_1, g_2, g_3, \ldots, g_{H'-1}$. In this case, $g_i (i=0, \ldots, H'-1)$ is indicative of a column vector having a length $(Q_m \cdot N_L)$. $H=(G+N_L \cdot Q_{CQI})$ and $H'=H/(N_L \cdot Q_m)$. $N_L$ is the number of layers to which an UL-SCH transport block has been mapped. H is a total number of coded bits allocated to the $N_L$ transmission layers to which the transport block has been mapped for the UL-SCH data and CQI/PMI information.

Next, the multiplexed data and CQI/PMI and the separately channel-coded RI and ACK/NACK are subjected to channel interleaving, thereby generating an output signal at step S129.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 13 shows the configuration of a known MIMO communication system.

Referring to FIG. 13, if the number of transmission (Tx) antennas is increased to $N_T$ and the number of reception (Rx) antennas is increased to $N_R$ at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment $R_i$ by a maximum transfer rate $R_o$ if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (NT×NR) of the number of transmission antennas (NT) and the number of reception antennas (NR).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 13, it is assumed that $N_T$ transmission antennas and $N_R$ reception antennas are present.

First, a transmission signal is described below. If the $N_T$ transmission antennas are present as described above, a maximum number of pieces of information which can be transmitted are $N_T$, which may be represented using the following vector.

$$s = [s_1, s_2, \ldots, s_{N_T}]^T \qquad \text{[Equation 2]}$$

Meanwhile, transmission power may be different in each of pieces of transmission information $s_1, s_2, \ldots, s_{NT}$. In this case, if pieces of transmission power are $P_1, P_2, \ldots, P_{NT}$, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Furthermore, $\hat{s}$ may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, the information vector $\hat{s}$ having controlled transmission power is multiplied by a weight matrix W, thus forming $N_T$ transmission signals $x_1, x_2, \ldots, x_{NT}$ that are actually transmitted. In this case, the weight matrix functions to properly distribute the transmission information to antennas according to a transport channel condition. The following may be represented using the transmission signals $x_1, x_2, \ldots, x_{NT}$.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In this case, $w_{ij}$ denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If $N_R$ reception antennas are present, the reception signals $y_1, y_2, \ldots, y_{NR}$ of the respective antennas are represented as follows using a vector y.

$$y=[y_1,y_2,\ldots,y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as $h_{ij}$. In this case, it is to be noted that in order of the index of $h_{ij}$, the index of a reception antenna comes first and the index of a transmission antenna then comes.

Several channels may be grouped and expressed in a vector and matrix form. For example, a vector expression is described below.

FIG. 14 is a diagram showing a channel from a plurality of transmission antennas to a single reception antenna.

As shown in FIG. 14, a channel from a total of $N_T$ transmission antennas to a reception antenna i may be represented as follows.

$$h_i^T=[h_{i1},h_{i2},\ldots,h_{iN_T}] \quad \text{[Equation 7]}$$

Furthermore, if all channels from the $N_T$ transmission antenna to $N_R$ reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Meanwhile, Additive White Gaussian Noise (AWGN) is added to an actual channel after the actual channel experiences the channel matrix H. Accordingly, AWGN $n_1, n_2, \ldots, n_{NR}$ added to the $N_R$ reception antennas, respectively, are represented using a vector as follows.

$$n=[n_1,n_2,\ldots,n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_i \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas $N_R$, and the number of columns becomes equal to the number of transmission antennas $N_T$. That is, the channel matrix H becomes an $N_R \times N_T$ matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission when signal is transmitted through a channel and a method of transmitting signal known to both the transmission side and the reception side is mostly used. The aforementioned signal is called a pilot signal or Reference Signal (RS).

When data is transmitted/received using a multi-input/output antenna, a channel state between a transmission antenna and a reception antenna needs to be detected in order to accurately receive a signal. Accordingly, each transmission antenna needs to have an individual reference signal.

A downlink reference signal includes a Common Reference Signal (CRS) shared by all UEs within one cell and a Dedicated Reference Signal (DRS) for specific UE. Information for demodulation and channel measurement may be provided using such reference signals.

The reception side (i.e., US) measures a channel state based on a CRS and feeds indicators related to channel quality, such as a Channel Quality Indicator (CQI), a Precoding Matrix Index (PMI) and/or a Rank Indicator (RI), back to the transmission side (i.e., an eNB). The CRS is also called a cell-specific RS. In contrast, a reference signal related to the feedback of Channel State Information (CSI) may be defined as a CSI-RS.

The DRS may be transmitted through resource elements if data on a PDSCH needs to be demodulated. UE may receive information about whether a DRS is present through a higher layer, and the DRS is valid only if a corresponding PDSCH has been mapped. The DRS may also be called a US-specific RS or demodulation RS (DMRS).

FIG. 15 illustrates a reference signal pattern mapped to a downlink resource block pair in a wireless communication system to which an embodiment of the present invention may be applied.

Referring to FIG. 15, a downlink resource block pair, that is, a unit in which a reference signal is mapped unit, may be represented in the form of one subframe in a time domain X 12 subcarriers in a frequency domain. That is, in a time axis (i.e., x axis), one resource block pair has a length of 14 OFDM symbols in the case of a normal Cyclic Prefix (CP) (FIG. 15a) and has a length of 12 OFDM symbols in the case of an extended CP (FIG. 15b). In the resource block lattice, Resource Elements (REs) indicated by "0", "1", "2", and "3" mean the positions of the CRSs of antenna port indices "0", "1", "2", and "3", and REs indicated by "D" denotes the position of a DRS.

A CRS is described in detail below. The CRS is used to estimate the channel of a physical antenna and is a reference signal which may be received by all UEs located in a cell in common. The CRS is distributed to the entire frequency bandwidth. Furthermore, the CRS may be used for Channel Quality Information (CQI) and data demodulation.

The CRS is defined in various formats depending on an antenna array on the transmission side (i.e., an eNB). In a 3GPP LTE system (e.g., release-8), various antenna arrays are supported, and the transmission side of a downlink signal has three types of antenna arrays, such as 3 single transmission antennas, 2 transmission antennas, and 4 transmission antennas. If an eNB uses a single transmission antenna, reference signals for a single antenna port are arrayed. If an eNB uses 2 transmission antennas, reference signals for 2 transmission antenna ports are arrayed using a Time Division Multiplexing (TDM) method and/or a Frequency Division Multiplexing (FDM) method. That is, different time resources and/or different frequency resources are allocated so that reference signals for 2 antenna ports are distinguished from each other.

Furthermore, if an eNB uses 4 transmission antennas, reference signals for 4 transmission antenna ports are arrayed using the TDM and/or FDM methods. Channel information measured by the reception side (i.e., UE) of a downlink signal may be used to demodulate data transmitted using a transmission method, such as single transmission antenna transmission, transmission diversity, closed-loop spatial multiplexing, open-loop spatial multiplexing, or an multi-User-multi-input/output (MIMO) antennas.

If a multi-input/output antenna is supported, when a reference signal is transmitted by a specific antenna port, the reference signal is transmitted in the positions of resource elements specified depending on the pattern of the reference signal and is not transmitted in the positions of resource elements specified for other antenna ports. That is, reference signals between different antennas do not overlap.

A rule for mapping a CRS to a resource block is defined as follows.

$$k = 6m + (v + v_{shift}) \mod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \mod 2) & \text{if } p = 2 \\ 3 + 3(n_s \mod 2) & \text{if } p = 3 \end{cases}$$

$$v_{shift} = N_{ID}^{cell} \mod 6$$

In Equation 12, k and l denote a subcarrier index and a symbol index, respectively, and p denotes an antenna port. $N_{DL}^{symb}$ denotes the number of OFDM symbols in one downlink slot, and $N_{RB}^{DL}$ denotes the number of radio resources allocated to downlink. $n_s$ denotes a slot index, and $N_{ID}^{cell}$ denotes a cell ID. mod denotes modulo operation. The position of a reference signal is different depending on a value $v_{shift}$ in a frequency domain. Since the value $v_{shift}$ depends on a cell ID, the position of a reference signal has various frequency shift values depending on a cell.

More specifically, in order to improve channel estimation performance through a CRS, the position of a CRS may be shifted in a frequency domain. For example, if reference signals are placed at an interval of 3 subcarriers, reference signals in one cell are allocated to a 3k-th subcarrier, and reference signals in the other cell are allocated to a (3k+1)-th subcarrier. From the point of view of a single antenna port, reference signals are arrayed at an interval of 6 resource elements in a frequency domain. Reference signals are spaced apart from reference signals allocated in other antenna ports at an interval of 3 resource elements.

In a time domain, reference signals are started from the symbol index 0 of each slot and are arrayed at a constant interval. A time interval is different defined depending on the length of a cyclic prefix. In the case of a normal cyclic prefix, reference signals are placed in the symbol indices 0 and 4 of a slot. In the case of an extended cyclic prefix, reference signals are placed in the symbol indices 0 and 3 of a slot. A reference signal for an antenna port that belongs to 2 antenna ports and that has a maximum value is defined within one OFDM symbol. Accordingly, in the case of 4 transmission antenna transmission, reference signals for RS antenna ports 0 and 1 are placed in the symbol indices 0 and 4 of a slot (i.e., symbol indices 0 and 3 in the case of an extended cyclic prefix), and reference signals for antenna ports 2 and 3 are placed in the symbol index 1 of the slot. The positions of reference signals for antenna ports 2 and 3 in a frequency domain are changed in a second slot.

A DRS is described in more detail below. The DRS is used to demodulate data. In multi-input/output antenna transmission, precoding weight used for specific UE is combined with a transport channel transmitted by each transmission antenna when the UE receives a reference signal and is used to estimate a corresponding channel without any change.

A 3GPP LTE system (e.g., release-8) supports a maximum of 4 transmission antennas and uses a DRS for rank beamforming. The DRS for rank 1 beamforming also indicates a reference signal for an antenna port index 5.

A rule on which a DRS is mapped to a resource block is defined as follows. Equation 13 illustrates a normal cyclic prefix, and Equation 14 illustrates an extended cyclic prefix.

$$k = (k')\bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m'(2 + v_{shift})\bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k')\bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m'(2 + v_{shift})\bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 12 to 14, k and p denote a subcarrier index and an antenna port, respectively. $N_{RB}^{DL}$ and $N_{ID}^{cell}$ denote the number of RBs allocated to downlink, the number of slot indices, and the number of cell IDs. The position of an RS is different depending on the value $v_{shift}$ from the point of view of a frequency domain.

In Equations 13 and 14, k and l denote a subcarrier index and a symbol index, respectively, and p denotes an antenna port. $N_{sc}^{RB}$ denotes the size of an RB in a frequency domain and is represented as the number of subcarriers. $n_{PRB}$ denotes the number of physical RBs. $N_{RB}^{PDSCH}$ denotes the frequency bandwidth of an RB for PDSCH transmission. $n_s$ denotes the index of a slot, and $N_{ID}^{cell}$ denotes the ID of a cell. mod denotes modulo operation. The position of a reference signal is different depending on the value $v_{shift}$ in a frequency domain. Since the value $v_{shift}$ depends on the ID of a cell, the position of a reference signal has various frequency shift values depending on a cell.

Sounding Reference Signal (SRS)

An SRS is mostly used in the measurement of channel quality in order to perform uplink frequency-selective scheduling and is not related to the transmission of uplink data and/or control information, but the present invention is not limited thereto. The SRS may be used for various other purposes for improving power control or various startup functions of UEs which have not been recently scheduled. The startup functions may include an initial Modulation and Coding Scheme (MCS), initial power control for data transmission, a timing advance, and frequency semi-selective scheduling, for example. In this case, the frequency semi-selective scheduling means selectively allocating a frequency resource to the first slot of a subframe and pseudo-randomly hopping to another frequency in the second slot of the subframe and allocating frequency resources.

Furthermore, the SRS may be used to measure downlink channel quality, assuming that a radio channel is reciprocal between uplink and downlink. Such an assumption is particularly valid when the same frequency spectrum is shared between uplink and downlink and in Time Division Duplex (TDD) systems separated in a time domain.

The subframes of an SRS transmitted by UE within a cell may be represented by a cell-specific broadcasting signal. A 4-bit cell-specific parameter "srsSubframeConfiguration" indicates 15 available subframe arrays in which an SRS may be transmitted though respective radio frames. In accordance with such arrays, the flexibility of control of SRS overhead can be provided according to a deployment scenario.

A sixteenth array completely turns off the switch of an SRS within a cell, which is mostly suitable for a serving cell which provides service to high-speed UEs.

FIG. 16 illustrates an uplink subframe including the symbols of a Sounding Reference Signal (SRS) in a wireless communication system to which an embodiment of the present invention may be applied.

Referring to FIG. 16, an SRS is always transmitted through the last SC-FDMA symbol in an arrayed subframe. Accordingly, an SRS and DMRS are placed in different SC-FDMA symbols. The transmission of PUSCH data is not permitted in a specific SC-FDMA symbol for SRS transmission. As a result, if sounding overhead is the highest, that is, although an SRS symbol is included in all subframes, sounding overhead does not exceed about 7%.

Each SRS symbol is generated based on a base sequence (i.e., a random sequence or a sequence set based on Zadoff-Ch (ZC)) regarding a given time unit and frequency bandwidth. All UEs within the same cell use the same base sequence. In this case, the transmissions of SRSs from a plurality of UEs within the same cell in the same frequency bandwidth and the same time are orthogonal to each other by different cyclic shifts of a base sequence and are distinguished from each other.

SRS sequences from different cells may be distinguished from each other because different base sequences are allocated to respective cells, but orthogonality between the different base sequences is not guaranteed.

Coordinated Multi-Point (CoMP) Transmission and Reception

In line with the demand of LTE-advanced, there has been proposed CoMP transmission in order to improve system performance. CoMP is also called co-MIMO, collaborative MIMO, or network MIMO. CoMP is expected to improve performance of UE located in a cell edge and to improve the average throughput of a cell (or sector).

In general, inter-cell interference deteriorates performance of UE located in a cell edge and the average cell (or sector) efficiency in a multi-cell environment in which a frequency reuse factor is 1. In order to reduce inter-cell interference, a simple passive method, such as Fractional Frequency Reuse (FFR), has been applied to an LTE system so that UE placed in a cell edge in an interference-limited environment has proper performance efficiency. However, instead of reducing the use of frequency resources per cell, a method of reusing inter-cell interference as a signal required to be received by UE or reducing inter-cell interference is more advantageous. In order to achieve the above object, a CoMP transmission method may be used.

A CoMP method applicable to downlink may be divided into a Joint Processing (JP) method and a Coordinated Scheduling/Beamforming (CS/CB) method.

In the JP method, data may be used in each point (ie, eNB) of a CoMP unit. The CoMP unit means a set of eNBs used in the CoMP method. The JP method may be subdivided into a joint transmission method and a dynamic cell selection method.

The joint transmission method is a method of transmitting, by a plurality of points, that is, some or all of the points of a CoMP unit, signals through a PDSCH at the same time. That is, data transmitted to one UE is transmitted from a plurality of transmission points at the same time. The quality of a signal transmitted to UE can be improved coherently or non-coherently and interference between the UE and another UE can be actively removed through such a joint transmission method.

The dynamic cell selection method is a method of sending a signal by one point of a CoMP unit through a PDSCH. That is, data transmitted to one UE on a specific time is transmitted from one point, but is not transmitted from another point within the CoMP unit to the UE. A point at which data is transmitted to UE may be dynamically selected.

In accordance with the CS/CB method, a CoMP unit performs beamforming in cooperation in order to send data to one UE. That is, data is transmitted to UE in a serving cell only, but user scheduling/beamforming may be determined through cooperation between a plurality of cells within a CoMP unit.

In some embodiments, CoMP reception means the reception of a signal transmitted by cooperation between a plurality of points that are geographically separated. A CoMP method which may be applied to uplink may be divided into a Joint Reception (JR) method and a Coordinated Scheduling/Beamforming (CS/CB) method.

The JR method is a method of receiving, by a plurality of points, that is, some or all of the points of a CoMP unit, a signal transmitted through a PDSCH. In the CS/CB method, a signal transmitted through a PDSCH is received only at one point, but user scheduling/beamforming may be determined through cooperation between a plurality of cells within a CoMP unit.

Relay Node (RN)

In a relay node, data transmitted/received between an eNB and UE is transferred through two different links (i.e., a backhaul link and an access link). An eNB may include a donor cell. A relay node is wirelessly connected to a radio access network through a donor cell.

In relation to the use of the bandwidth (or spectrum) of a relay node, a case where a backhaul link operates in the same frequency bandwidth as that of an access link is called an "in-band", and a case where a backhaul link and an access link operate in different frequency bandwidths is called an "out-band." In both the in-band and the out-band, UE (hereinafter called "legacy UE") operating in accordance with an existing LTE system (e.g., release-8) needs to be able to access a donor cell.

A relay node may be divided into a transparent relay node and a non-transparent relay node depending on whether UE recognizes a relay node. The term "transparent" means whether UE communicates with a network through a relay node is not recognized. The term "non-transparent" means whether UE communicates with a network through a relay node is recognized.

In relation to control of a relay node, a relay node may be divided into a relay node formed as part of a donor cell and a relay node autonomously controlling a cell.

A relay node formed as part of a donor cell may have a relay node identity (relay ID), but does not have its own cell identity.

If at least part of Radio Resource Management (RRM) is controlled by an eNB belonging to a donor cell, it is called a relay node formed as part of a donor cell although the remaining parts of the RRM are placed in the relay node. Such a relay node may support legacy UE. For example, various types of smart repeaters, decode-and-forward relays, and second layer (L2) relay nodes and a Type-2 relay node correspond to such a relay node.

In the case of a relay node autonomously controlling a cell, the relay node controls one or a plurality of cells, and a unique physical layer cell identity is provided to each of the cells controlled by the relay node. Furthermore, the cells controlled by the relay node may use the same RRM mechanism. From a viewpoint of UE, there is no difference between access to a cell controlled by a relay node and access to a cell controlled by a common eNB. A cell controlled by such a relay node can support legacy UE. For example, a self-backhauling relay node, a third layer (L3) relay node, a Type-1 relay node, and a Type-1a relay node correspond to such a relay node.

The Type-1 relay node is an in-band relay node and controls a plurality of cells, and each of the plurality of cells is seen by UE as a separate cell different from a donor cell. Furthermore, the plurality of cells has different physical cell IDs (this is defined in LTE release-8), and the relay node may send its own synchronization channel and reference signal. In the case of one cell operation, UE directly may receive scheduling information and HARQ feedback from a relay node and send its own control channels (e.g., a Scheduling Request (SR), a CQI, and ACK/NACK) to the relay node. Furthermore, the Type-1 relay node is seen by legacy UE (i.e., UE operating in accordance with an LTE release-8 system) as a legacy eNB (i.e., an eNB operating in accordance with an LTE release-8 system). That is, the Type-1 relay node has backward compatibility. Meanwhile, the Type-1 relay node is seen by UEs operating in accordance with an LTE-A system as an eNB different from a legacy eNB, thereby being capable of providing improved performance.

The Type-1a relay node has the same characteristics as the Type-1 relay node except that it operates in an out-band. The operation of the Type-1a relay node may be configured so that an influence on a first layer (L1) operation is minimized.

The Type-2 relay node is an in-band relay node, and it does not have a separate physical cell ID and thus does not form a new cell. The Type-2 relay node is transparent to legacy UE, and the legacy UE does not recognize the presence of the Type-2 relay node. The Type-2 relay node may send a PDSCH, but does not send at least CRS and PDCCH.

In order to prevent a relay node from operating in in-band, some resources in a time-frequency domain may need to be reserved for a backhaul link and may be configured so that they are not used for an access link. This is called resource partitioning.

A known principle in resource partitioning in a relay node may be described as follows. Backhaul downlink and access downlink may be multiplexed according to a Time Division Multiplexing (TDM) method on one carrier frequency (i.e., only one of a backhaul downlink and an access downlink in a specific time is activated). Likewise, backhaul uplink and access uplink may be multiplexed according to a TDM method on one carrier frequency (i.e., only one of a backhaul uplink and an access uplink in a specific time is activated).

In backhaul link multiplexing in FDD, backhaul downlink transmission may be performed in a downlink frequency bandwidth, and the transmission of a backhaul uplink may be performed in an uplink frequency bandwidth. In backhaul link multiplexing in TDD, backhaul downlink transmission may be performed in a downlink subframe of an eNB and a relay node, and the transmission of a backhaul uplink may be performed in an uplink subframe of an eNB and a relay node.

In the case of an in-band relay node, for example, when the reception of a backhaul downlink from an eNB and the transmission of an access downlink to UE are performed in the same frequency bandwidth at the same time, signal interference may be generated in the reception end of a relay node due to a signal transmitted by the transmission end of the relay node. That is, signal interference or RF jamming may be generated in the RF front end of the relay node. Likewise, when the transmission of a backhaul uplink to an eNB and the reception of an access uplink from UE are performed in the same frequency bandwidth at the same time, signal interference may be generated.

Accordingly, in order for a relay node to send/receive signals in the same frequency bandwidth at the same time, a sufficient separation needs to be provided between a reception signal and a transmission signal (e.g., that the reception signal and the transmission signal need to be sufficiently separated geographically, such as that a transmission antenna and a reception antenna are installed on the ground and in the grave, respectively).

One method for solving such signal interference is to allow a relay node to operate in such a way as not to send a signal to UE while receiving a signal from a donor cell. That is, a gap is generated in transmission from the relay node to the UE, and the UE (including legacy UE) is configured to not expect any transmission from the relay node during the gap. Such a gap may be configured by configuring a Multicast Broadcast Single Frequency Network (MBSFN) subframe.

FIG. 17 illustrates the segmentation of a relay node resource in a wireless communication system to which an embodiment of the present invention may be applied.

In FIG. 17, a first subframe is a common subframe, and a downlink (i.e., access downlink) control signal and data are transmitted from a relay node to UE in the first subframe. In contrast, a second subframe is an MBSFN subframe, and a control signal is transmitted from the relay node to the UE in the control region of the downlink subframe, but no transmission is performed from the relay node to the UE in the remaining region of the downlink subframe. In this case, since legacy UE expects the transmission of a PDCCH in all downlink subframes (i.e., a relay node needs to provide support so that legacy UEs within the region of the relay node perform measurement functions by receiving a PDCCH every subframe), the PDCCH needs to be transmitted in all downlink subframes for the correct operation of the legacy UE. Accordingly, the relay node does not perform backhaul downlink reception, but needs to perform access downlink transmission in the first N (N=1, 2 or 3) OFDM symbol period of a subframe (i.e., the second subframe) on the subframe configured for downlink (i.e., backhaul downlink) transmission from an eNB to the relay node. For this, the relay node may provide backward compatibility to serving legacy UE because a PDCCH is transmitted from the relay node to the UE in the control region of the second subframe. The relay node may receive transmission from the eNB while no transmission is performed from the relay node to the UE in the remaining region of the second subframe. Accordingly, access downlink transmission and backhaul downlink reception may not be performed at the same time in an in-band relay node through such a resource partitioning method.

The second subframe using an MBSFN subframe is described in detail. The control region of the second subframe may be said to be a relay node non-hearing period. The relay node non-hearing interval means an interval in which a relay node does not receive a backhaul downlink signal, but sends an access downlink signal. The interval may be configured to have a 1, 2 or 3 OFDM length, such as that described above. A relay node performs access downlink transmission to UE in a relay node non-hearing interval, but may perform backhaul downlink reception from an eNB in the remaining region. In this case, time is taken for the relay node to switch from transmission mode to reception mode because the relay node is unable to perform transmission/reception in the same frequency bandwidth at the same time. Accordingly, a Guard Time (GP) needs to be configured so that the relay node switches to transmission/reception mode in the first some interval of a backhaul downlink reception region. Likewise, a guard time for enabling the relay node to switch to reception/transmission mode may be configured although the relay node operates in such a way as to receive a backhaul downlink from the eNB and to send an access downlink to the UE. The length of such a guard time may be set as a value in a time domain. For example, the length of the guard time may be set as a k (k≥1) time sample (Ts) value or may be set as one or more OFDM symbol length. Alternatively, relay node backhaul downlink subframes may be contiguously configured, or the guard time of the last part of a subframe may not be defined or configured according to a specific subframe timing alignment relationship. Such a guard time may be defined only in a frequency domain configured for backhaul downlink subframe transmission in order to maintain backward compatibility (if a guard time is configured in an access downlink interval, legacy UE cannot be supported). In a backhaul downlink reception interval other than the guard time, the relay node can receive a PDCCH and a PDSCH from the eNB. This may be represented by a relay-PDCCH (R-PDCCH) and a relay-PDSCH (R-PDSCH) in the meaning of a relay node-dedicated physical channel.

Channel State Information (CSI) Feedback

An MIMO method may be divided into an open-loop method and a closed-loop method. In the open-loop method, a transmission end performs MIMO transmission without the feedback of CSI from an MIMO reception end. In the closed-loop MIMO method, a transmission end receives CSI fed back by an MIMO reception end and performs MIMO transmission. In the closed-loop MIMO method, in order to obtain the multiplexing gain of an MIMO transmission antenna, each of a transmission end and a reception end may perform beamforming based on CSI. A transmission end (e.g., an eNB) may allocate an uplink control channel or an uplink shared channel to a reception end (e.g., UE) so that a reception end (e.g., UE) is able to feed CSI back.

The feedback CSI may include a Rank Indicator (RI), a Precoding Matrix Index (PMI), and a Channel Quality Indicator (CQI).

The RI is information about a channel rank. The channel of a rank means a maximum number of layers (or streams) in which different information may be transmitted through the same time-frequency resource. A rank value may be fed back in a longer cycle (i.e., less frequently) than a PMI and CQI because it is mostly determined by long term fading of a channel.

The PMI is information about a precoding matrix which is used in transmission from a transmission end and is a value into which the spatial characteristic of a channel is reflected. The term "precoding" means that a transmission layer is mapped to a transmission antenna, and a layer-antenna mapping relationship may be determined based on a precoding matrix. The PMI corresponds to the PMI of an eNB, which is preferred by UE based on a metric, such as a Signal-to-Interference plus Noise Ratio (SINR). In order to reduce feedback overhead of precoding information, a method of previously sharing, by a transmission end and a reception end, a codebook including several precoding matrices and feeding only an index indicative of a specific precoding matrix in the corresponding codebook back may be used.

The CQI is information indicative of the intensity of channel or quality of channel. The CQI may be represented as a predetermined MCS combination. That is, a CQI index that is fed back is indicative of a corresponding modulation scheme and coding rate. In general, the CQI is a value into which a reception SINR which may be obtained when an eNB configures a space channel using a PMI is reflected.

In a system (e.g., LTE-A system) supporting an extended antenna configuration, to obtain additional multi-user diversity using a multi-user-MIMO (MU-MIMO) method is taken into consideration. In the MU-MIMO method, an interference channel is present between UEs multiplexed in an antenna region. Accordingly, it is necessary to prevent interference from occurring in another UE if an eNB performs downlink transmission using CSI fed back by one UE of multiple users. Accordingly, in order for an MU-MIMO operation to be correctly performed, CSI having higher accuracy compared to a single user-MIMO (SU-MIMO) method needs to be fed back.

A new CSI feedback method using improved CSI including an existing RI, PMI, and CQI may be used so that more accurate CSI can be measured and reported as described above. For example, precoding information fed back by a reception end may be indicated by a combination of two PMIs. One (the first PMI) of the two PMIs has the attributes of a long term and/or a wideband and may be called W1. The other (the second PMI) of the two PMIs has the attributes of a short term and/or a sub-band and may be called W2. The final PMI may be determined by a combination (or function) of W1 and W2. For example, assuming that the final PMI is W, W=W1*W2 or W=W2*W1 may be defined.

In this case, the average characteristics of a channel in terms of the frequency and/or time are reflected in W1. In other words, W1 may be defined as CSI in which the characteristics of a long term channel in terms of time are reflected, the characteristics of a wideband channel in terms of frequency are reflected, or the characteristics of a long term channel in terms of time and a wideband channel in terms of frequency are incorporated. In order to simply represent such characteristics of W1, W1 is called CSI of long term-wideband attributes (or a long term wideband PMI).

A channel characteristic that is instantaneous compared to W1 is reflected in W2. In other words, W2 may be defined as CSI in which the characteristics of a short term channel in terms of time are reflected, the characteristics of a sub-band channel in terms of frequency are reflected, or the characteristics of a short term channel in terms of time and a sub-band channel in terms of frequency are reflected. In order to simply represent such characteristics of W2, W2 is called CSI of a short term-sub-band attributes (or a short term sub-band PMI).

In order for one final precoding matrix W to be determined based on information about 2 different attributes (e.g., W1 and W2) indicative of a channel state, it is necessary to configure a separate codebook including precoding matrices indicative of channel information about attributes (i.e., a first codebook for W1 and a second codebook for W2). The form of a codebook configured as described above may be called a hierarchical codebook. Furthermore, to determine a codebook to be finally used using the hierarchical codebook may be called hierarchical codebook transformation.

If such a codebook is used, channel feedback of higher accuracy compared to a case where a single codebook is used is made possible. Single cell MU-MIMO and/or multi-cell cooperation communication may be supported using channel feedback of higher accuracy as described above.

Enhanced PMI for MU-MIMO or CoMP

In a next-generation communication standard, such as LTE-A, there has been proposed transmission schemes, such as MU-MIMO and CoMP, in order to achieve a high transfer rate. In order to implement such improved transmission schemes, UE needs to feed more complicated and various CSI back to an eNB.

For example, in MU-MIMO, a CSI feedback method of uploading, by UE-A, the PMI (hereinafter called a "best companion PMI (BCPMI)") of UE to be scheduled along with the UE-A, together with the desired PMI of the UE-A, when the UE-A selects a PMI is taken into consideration.

That is, when co-scheduled UE is used as a precoder in a precoding matrix codebook, it calculates a BCPMI that provides less interference to UE-A and additionally feeds the calculated BCPMI back to an eNB.

The eNB schedules the UE-A and another UE which prefers BCPM (Best Companion Precoding Matrix (BCPM) corresponding to a BCPMI) precoding using the information.

A BCPMI feedback method is divided into explicit feedback and implicit feedback depending on whether feedback payload is present or not.

First, there is an explicit feedback method having feedback payload.

In the explicit feedback method, UE-A determines a BCPMI within a precoding matrix codebook and feeds the BCPMI back to an eNB through a control channel. In one method, UE-A may select an interference signal precoding matrix that maximizes an estimated SINR within a codebook and feed the interference signal precoding matrix back as a BCPMI value.

An advantage of the explicit feedback method is to select a BCPMI more effective in removing interference and to send the selected BCPMI. The reason for this is that, assuming that each of all codewords within a codebook is one interference beam, UE determines a value most effective in removing interference to be a BCPMI by performing comparison on metrics, such as SINRs. A greater feedback payload size is required because candidate BCPMIs are increased as a codebook size is increased.

Second, there is an implicit feedback method not having feedback payload.

In the implicit feedback method, UE-A does not search a codebook for a codeword having the least interference and select the retrieved codebook as a BCPMI, but a corresponding BCPMI is statically determined once a desired PMI is determined. In this case, a BCPMI may include vectors orthogonal to the determined desired PMI.

The reason for this is that it is effective to reduce interference from an interference signal when desired PM is selected in directions other than the direction of a PM because the desired PM has been configured in the direction in which the channel gain of a channel H can be maximized in order to maximize a reception SINR. If the channel H is analyzed as a plurality of independent channels through Singular Value Decomposition (SVD), such a BCPMI decision method is further justified. A 4×4 channel H may be decomposed through SVD as in Equation 15 below.

$$H = ULV^H = [u_1\ u_2\ u_3\ u_4] \begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix} \begin{bmatrix} v_1^H \\ v_2^H \\ v_3^H \\ v_4^H \end{bmatrix}$$ [Equation 15]

In Equation 15, U,V is a unitary matrix. $u_i$, $v_i$, and $\lambda_i$ are the 4×1 left singular vector, 4×1 right singular vector, and singular value of a channel H and are arranged in $\lambda_i > \lambda_{i+1}$ in descending order. All channel gains which may be theoretically obtained if a beamforming matrix V is used in a transmission end and a beamforming matrix $U^H$ is used in a reception end can be obtained without a loss.

In the case of a rank 1, optimal performance may be obtained from the point of view of an SNR because a channel gain $|\lambda_i|^2$ is obtained when a transmission beamforming vector $v_1$ and a reception beamforming vector u1 are used. For example, it is advantage for UE-A to select a PM most similar to $v_1$ in the case of a rank 1. If a desired PM is ideally matched up with $v_1$, an interference signal can be perfectly removed without a loss of a desired signal by setting a reception beam as $u_1$ and setting the transmission beam of the interference signal in a direction orthogonal to the PM. If there is some difference between a desired PM and $v_1$ due to a quantization error, however, an interference signal may not be perfectly removed without a loss of a desired signal because the transmission beam of the interference signal set in the direction orthogonal to the PM is no longer the same as a beam orthogonal to $v_1$, but it may help control the interference signal if the quantization error is small.

As an example of implicit feedback, if an LTE codebook is used, a BCPMI may be statically determined to be a vector index orthogonal to a PMI.

In this case, it has been assumed that the number of transmission antennas is 4 and UE which has fed the PMI back has a reception rank of 1, and 3 vectors orthogonal to a desired PMI are represented as 3 BCPMIs.

For example if a PMI is 3, a BCPMI is determined to be 0, 1, or 2. The PMI and the BCPMI are indicative of the indices of a 4×1 vector codeword within a codebook. An eNB considers the BCPMI set (BCPMI=0, 1, 2) to be a valid precoding index for removing interference and uses some of or the entire BCPMI set as the precoder of co-schedule UE.

An advantage of an implicit PMI is that there is no additional feedback overhead because a desired PMI and a BCPMI set are mapped in a 1:1 way. However, a BCPM dependent on desired PM may have an error in the direction of an optimal interference removal beam due to the quantization error of the desired PM (i.e., a precoding matrix corresponding to a PMI). If a quantization error is not present, all 3 BCPMs represent interference beams (ideal interference beams) for perfectly removing interference. If a quantization error is present, however, there is a difference between the beam of each of the 3 BCPMs and an ideal interference beam.

Furthermore, a difference between the ideal interference beams of the BCPMs is the same in average, but may be different on a specific moment. For example, if a desired PMI=3, it may be effective to remove an interference signal in order of BCPMIs 0, 1, and 2. In this case, there is a possibility that an eNB unaware of a relative error between the BCPMIs 0, 1, and 2 may determine the BCPMI 2 having the greatest error with an ideal interference beam to be the beam of an interference signal and may perform communication in the state in which strong interference is present between co-scheduled UEs.

General (Device-to-Device) D2D Communication

In general, D2D communication is limitedly used as a term indicative of communication between things or thing intelligence communication. In an embodiment of the present invention, however, D2D communication may include all types of communication between a variety of types of devices having a communication function, such as smart phones and personal computers, in addition to simple devices having a communication function.

FIG. 18 is a diagram conceptually illustrating D2D communication in a wireless communication system to which an embodiment of the present invention may be applied.

FIG. 18a shows an existing communication method based on an eNB. UE1 may send data to an eNB in uplink, and the eNB may send data to UE2 in downlink. Such a communication method may be called an indirect communication method through an eNB. An Un link (i.e., a link between eNBs or a link between an eNB and a relay node, which may be called a backhaul link), that is, a link defined in an existing wireless communication system, and/or an Uu link (i.e., a link between an eNB and UE or a link between a relay node and UE, which may be called an access link) may be related to the indirect communication method.

FIG. 18b shows a UE-to-UE communication method, that is, an example of D2D communication. The exchange of data between UEs may be performed without the intervention of an eNB. Such a communication method may be called a direct communication method between devices. The D2D direct communication method has advantages of reduced latency and the use of lesser radio resources compared to the existing indirect communication method through an eNB.

FIG. 19 shows an example of various scenarios of D2D communication to which a method proposed in this specification may be applied.

A scenario for D2D communication may be basically divided into (1) an out-of-coverage network, (2) a partial-coverage network, and (3) an in-coverage network depending on where UE1 and UE2 are placed within cell coverage (i.e., in-coverage) and out of cell coverage (i.e. out-of-coverage).

The in-coverage network may be divided into an in-coverage-single-cell and an in-coverage-multi-cell depending on the number of cells corresponding to coverage of an eNB.

FIG. 19(a) shows an example of an out-of-coverage network scenario for D2D communication.

The out-of-coverage network scenario means that D2D communication is performed between D2D UEs without control of an eNB.

From FIG. 19(a), it may be seen that only UE1 and UE2 are present and the UE1 and the UE2 perform direct communication.

FIG. 19(b) shows an example of a partial-coverage network scenario for D2D communication.

The partial-coverage network scenario means that D2D communication is performed between D2D UE placed within network coverage and D2D UE placed out of the network coverage.

From FIG. 19(b), it may be seen that UE1 placed within network coverage and UE2 placed out of the network coverage perform communication.

FIG. 19(c) shows an example of an in-coverage-single-cell scenario, and FIG. 19(d) shows an example of an in-coverage-multi-cell scenario.

The in-coverage network scenario means that D2D UEs perform D2D communication through control of an eNB within network coverage.

In FIG. 19(c), UE1 and UE2 are placed within the same network coverage (or cell) and perform D2D communication under the control of an eNB.

In FIG. 19(d), UE1 and UE2 are placed within network coverage, but are placed within different network coverage. Furthermore, the UE1 and the UE2 perform D2D communication under the control of eNBs managing each of network coverage.

D2D communication is described in more detail below.

D2D communication may be performed in the scenarios of FIG. 19, but may be commonly performed within network coverage (in-coverage) and out of network coverage (out-of-coverage). A link used for D2D communication (i.e., direct communication between UEs) may be called a D2D link, a directlink, or a sidelink, but is hereinafter generally called a sidelink, for convenience of description.

Sidelink transmission may be performed in an uplink spectrum in the case of FDD and may be performed in an uplink (or downlink) subframe in the case of TDD. Time Division Multiplexing (TDM) may be used for the multiplexing of sidelink transmission and uplink transmission.

Sidelink transmission and uplink transmission are not occured at the same time. Sidelink transmission is not occured in a sidelink subframe which partially or generally overlaps an uplink subframe or UpPTS used for uplink transmission. Furthermore, the transmission and reception of a sidelink are also not occured at the same time.

The structure of an uplink physical resource may be identically used as the structure of a physical resource used for sidelink transmission. However, the last symbol of a sidelink subframe includes a guard period and is not used for sidelink transmission.

A sidelink subframe may include an extended Cyclic Prefix (CP) or a normal CP.

D2D communication may be basically divided into discovery, direct communication, and synchronization.

1) Discovery

D2D discovery may be applied within network coverage (including an inter-cell and an intra-cell). In inter-cell discovery, both synchronous and asynchronous cell deployments may be taken into consideration. D2D discovery may be used for various commercial purposes, such as advertising, issuing coupons, and finding friends, to UE within a proximity region.

If UE 1 has a role of sending a discovery message, the UE 1 sends a discovery message, and UE 2 receives the discovery message. The transmission and reception roles of the UE 1 and the UE 2 may be changed. Transmission from the UE 1 may be received by one or more UE(s), such as the UE 2.

The discovery message may include a single MAC PDU. In this case, the single MAC PDU may include a UE ID and an application ID.

A physical sidelink discovery channel (PSDCH) may be defined as a channel for sending the discovery message. The structure of a PUSCH may be reused as the structure of the PSDCH.

Two types Type 1 and Type 2 may be used as a resource allocation method for D2D discovery.

In the case of Type 1, an eNB may allocate a resource for sending a discovery message in a non-UE-specific way.

To be specific, a radio resource pool comprising a plurality of subframe sets and a plurality of resource block sets for transmitting and receiving a discovery message within a specific period (in what follows, 'discovery period') is allocated, and a discovery transmitting UE selects a specific resource within the radio resource pool in an arbitrary manner and transmits a discovery message.

The periodic discovery resource pool can be allocated for transmission of a discovery signal in a semi-static manner. The configuration information of a discovery resource pool for discovery transmission includes a discovery period, a subframe set which can be used for transmission of a discovery signal within the discovery period, and information about a resource block set. The configuration information of the discovery resource pool can be transmitted to the UE through upper layer signaling. In the case of an in-coverage UE, the discovery resource pool for discovery transmission is set up by an eNB and can be informed to the UE through RRC signaling (for example, System Information Block (SIB)).

The discovery resource pool allocated for discovery within one discovery period can be multiplexed to a time-frequency resource block of the same size through TDM and/or FDM scheme, where the time-frequency resource block of the same size can be called a 'discovery resource'. A discovery resource can be set as one subframe unit and include two Physical Resource Blocks (PRBs) per slot in each subframe. One UE can use one discovery resource for transmission of a discovery MAC PDU.

Also, a UE can transmit a discovery signal repeatedly within a discovery period for transmission of one transport block. Transmission of a MAC PDU by one UE can be repeated (for example, four times) contiguously or non-contiguously within the discovery period (namely radio resource pool). The transmission times of a discovery signal for one transmission block can be transmitted to the UE through upper layer signaling.

UE may randomly select a first discovery resource in a discovery resource set which may be used for the repetitive transmission of an MAC PDU and may determine the remaining discovery resources in relation to the first discovery resource. For example, a specific pattern may be previously determined, and a next discovery resource may be determined according to the predetermined specific pattern depending on the position of a discovery resource first selected by UE. Alternatively, UE may randomly select each discovery resource within a discovery resource set which may be used for the repetitive transmission of an MAC PDU.

In the case of Type 2, a resource for discovery message transmission is allocated in a UE-specific way. Type 2 is subdivided into Type-2A and Type-2B. Type-2A is a method of allocating, by an eNB, a resource at the instance at which UE sends a discovery message within a discovery cycle, and Type-2B is a method of allocating resources semi-persistently.

In the case of Type-2B, RRC_CONNECTED UE requests an eNB to allocate a resource for the transmission of a D2D discovery message through RRC signaling. Furthermore, the eNB may allocate the resource through RRC signaling. When the UE transits to an RRC IDLE state or when the eNB withdraws resource allocation through RRC signaling, the UE releases the most recently allocated transmission resource. As described above, in the case of Type-2B, a radio resource may be allocated through RRC signaling, and the activation/deactivation of an allocated radio resource may be determined by a PDCCH.

A radio resource pool for receiving a discovery message may be configured by an eNB, and UE may be notified of the configured radio resource pool through RRC signaling (e.g., a System Information Block (SIB)).

Discovery message reception UE monitors both the aforementioned discovery resource pools of Type 1 and Type 2 in order to receive a discovery message.

2) Direct Communication

The region to which D2D direct communication is applied includes a network coverage edge area (i.e., edge-of-coverage) in addition to inside and outside network coverage (i.e., in-coverage and out-of-coverage). D2D direct communication may be used for purposes, such as Public Safety (PS).

If UE 1 has a role of direct communication data transmission, the UE 1 sends direct communication data, and UE 2 receives the direct communication data. The transmission and reception roles of the UE 1 and the UE 2 may be changed. The direct communication transmission from the UE 1 may be received by one or more UE(s), such as the UE 2.

D2D discovery and D2D communication may be independently defined without being associated with each other. That is, in groupcast and broadcast direct communication, D2D discovery is not required. If D2D discovery and D2D direct communication are independently defined as described above, UEs do not need to perceive adjacent UE. In other words, in the case of groupcast and broadcast direct communication, all reception UEs within a group are not required to be adjacent to each other.

A physical sidelink shared channel (PSSCH) may be defined as a channel for sending D2D direct communication data. Furthermore, a physical sidelink control channel (PSCCH) may be defined as a channel for sending control information (e.g., Scheduling Assignment (SA), a transmission format for direct communication data transmission, etc) for D2D direct communication. The structure of a PUSCH may be reused as the structures of the PSSCH and the PSCCH.

Two types of mode 1 and mode 2 may be used as a resource allocation method for D2D direct communication.

Mode 1 refers to a method of scheduling, by an eNB, data for D2D direct communication by UE or a resource used for UE to send control information. Mode 1 is applied to in-coverage.

An eNB configures a resource pool for D2D direct communication. In this case, the resource pool for D2D communication may be divided into a control information pool and a D2D data pool. When an eNB schedules control information and a D2D data transmission resource within a pool configured for transmission D2D UE using a PDCCH or ePDCCH, the transmission D2D UE sends control information and D2D data using the allocated resource.

Transmission UE requests a transmission resource from an eNB. The eNB schedules a resource for sending control information and D2D direct communication data. That is, in the case of mode 1, the transmission UE needs to be in the RRC_CONNECTED state in order to perform D2D direct communication. The transmission UE sends a scheduling request to the eNB, and a Buffer Status Report (BSR) procedure is performed so that the eNB may determine the amount of resources requested by the transmission UE.

Reception UEs monitors a control information pool. When decoding control information related to reception UE, the reception UE may selectively decode D2D data transmission related to corresponding control information. The reception UE may not decode a D2D data pool based on a result of the decoding of the control information.

Mode 2 refers to a method of randomly selecting, by UE, a specific resource in a resource pool in order to send data or control information for D2D direct communication. Mode 2 is applied to out-of-coverage and/or edge-of-coverage.

In mode 2, a resource pool for sending control information and/or a resource pool for sending D2D direct communication data may be pre-configured or may be configured semi-statically. UE is supplied with a configured resource pool (time and frequency) and selects a resource for D2D communication transmission in the resource pool. That is, the UE may select a resource for control information transmission in a control information resource pool in order to send control information. Furthermore, the UE may select a resource in a data resource pool in order to send D2D direct communication data.

In D2D broadcast communication, control information is transmitted by broadcasting UE. Control information is explicitly and/or implicitly indicative of the position of a resource for data reception in relation to a physical channel (i.e., a PSSCH) on which D2D direct communication data is carried.

3) Synchronization

A D2D synchronization signal (or a sidelink synchronization signal) may be used for UE to obtain time-frequency synchronization. In particular, since control of an eNB is impossible in the case of out-of-network coverage, a new signal and procedure for establishing synchronization between UEs may be defined.

UE which periodically sends a D2D synchronization signal may be called a D2D synchronization source. If a D2D synchronization source is an eNB, a transmitted D2D synchronization signal may have the same structure as a PSS/SSS. If a D2D synchronization source is not an eNB (e.g., UE or a Global Navigation Satellite System (GNSS)), the structure of a transmitted D2D synchronization signal may be newly defined.

A D2D synchronization signal is periodically transmitted in a cycle not less than 40 ms. UE may have multiple physical layer sidelink synchronization identities. A D2D synchronization signal includes a primary D2D synchronization signal (or a primary sidelink synchronization signal) and a secondary D2D synchronization signal (or a secondary sidelink synchronization signal).

UE may search for a D2D synchronization source before it sends a D2D synchronization signal. Furthermore, when the D2D synchronization source is searched for, the UE may obtain time-frequency synchronization through a D2D synchronization signal received from the retrieved D2D synchronization source. Furthermore, the UE may send a D2D synchronization signal.

In D2D communication, direct communication between two devices is described below as an example, for clarity, but the scope of the present invention is not limited thereto. The same principle described in an embodiment of the present invention may be applied to D2D communication between a plurality of two or more devices.

Reuse of D2D Device or Application ID

Recently various communication technologies are being developed to realize direction communication between devices (UEs), including 3GPP LTE D2D communication, WiFi direct service, Bluetooth, and Zigbee. Along with the development of these technologies, various services utilizing the technologies are emerging. Also, various attempts are being made to implement proximity-based services in an efficient manner in conjunction with direction communication technologies among a plurality of devices.

As a fundamental technology enabling the services, unique identifiers (IDs) are necessary, by which individual UEs can be identified and/or a plurality of direction communication services that a UE provides can be identified and/or a plurality of direction communication application programs that a UE provides can be identified and/or direct communication-related functions that a UE uses can be identified. In what follows, these identifiers are called 'D2D IDs'.

However, as the number of UEs or the number of services to be identified increases, length of a D2D ID is inevitably becomes long in proportion thereto. The increased length then functions as overhead against system implementation and makes D2D ID transmission and reception use more resources; therefore, it is very important to cautiously determine ID length. The ID length and format as determined above then should be designed to maintain backward compatibility so that enhanced services can be supported afterwards. For example, if the length of D2D ID for D2D devices is fixed by the 3GPP LTE D2D standardization, the number of supported services or the number of devices will be limited. If the D2D ID is designed so that it can have a variable length, the length should be reserved as the maximum value of a D2D ID transmission value; therefore, depending upon situations, resources may be wasted.

A (global) unique D2D ID assigned to a UE can be composed of various IDs (or parts of IDs) as shown below. It is evident that part of the IDs can be omitted or replaced with other names depending on local environments.

PLMN (Public Land Mobile Network) ID: comprises a Mobile Country Code (MCC) for identifying a country and a Mobile Network Code (MNC) for identifying a network service provider.

ProSe (Proximity Services) UE ID: an ID of a UE supporting a D2D service. One example is an upper layer ID or MAC ID.

ProSe Application ID: an ID for identifying a service or an application program.

The D2D ID used in this document denotes a unique ID expressed by an instance of the aforementioned identifier or a combination thereof; or an ID uniquely identified within a particular code set. A combination of all of the identifiers above is also called a global expression code. The composition of the ID above illustrates an example where the ID reflects service provider-specific, UE-specific, and service-specific aspects.

In some future scenario, it is anticipated that one UE may use multiple D2D IDs and one D2D beacon device (for example, a D2D device transmitting a discovery signal (or message)) provides an advertisement service by using a plurality of D2D IDs. In this case, a shop owner can advertise his or her shop in various ways by securing a plurality of D2D IDs. For example, by combining a plurality of D2D IDs in a proper way, the combined information itself can be made to carry special implication, thereby increasing the amount of information. In this way, as the number of D2D devices is increased, less D2D IDs will be available.

The present invention provides a method for reusing a limited number of D2D IDs in an efficient manner. To illustrate the method of reusing D2D IDs, an advertisement service based on D2D communication is introduced.

In general, in case a shop provides a business-oriented advertisement service by using a D2D beacon device, only the ID of the beacon device can be transmitted, or a D2D signal including additional attributes (for example, advertisement-related additional descriptions, attributes, and so on) can be transmitted. Such attribute information can be implemented by securing additional bits or by securing additional D2D IDs.

For example, if it is the case that one discovery signal (namely one D2D ID) is capable of delivering 1 bit information, two discovery signals is eventually able to deliver two bits of information; thus increase of assigned IDs leads to the increase of the amount of information that can be finally delivered. In this way, to deliver various types of information, namely to increase the amount of information, a plurality of IDs should be secured.

However, D2D ID itself may act as a means requiring payment in a future, and in this case, it is expected that obtaining additional D2D IDs will incur large costs. Therefore, delivering the most information firmly with the smallest number of D2D IDs possible may become a goal.

Therefore, to enable much information to be delivered with a small number of D2D IDs, reuse of a D2D ID is essential, and the present invention proposes a method for reusing the D2D ID in a way of interpreting the original meaning of the D2D ID differently according to a regional or temporal basis.

In other words, interpreting the meaning of a D2D ID differently indicates that an identifier of a UE (or a user or a service) which has transmitted a D2D ID is determined on the basis of a received D2D ID. In what follows, the identifier of a UE (or a user or a service) is collectively called a ° UE ID' for the convenience of description.

In what follows, a D2D ID according to the present invention can be transmitted through a discovery signal/message (for example, PSDCH), D2D direct communication message (for example, PSSCH), or D2D synchronization signal, which is collectively called a 'D2D signal' for the convenience of description.

First, a particular D2D ID may indicate a UE A (or a user or a service) or a UE B (or a user or a service) depending on a place/position, which will be described with reference to the drawings below.

FIG. 22 illustrates a method for determining a UE identifier according to one embodiment of the present invention.

FIG. 22 assume a situation that UE 1 is located in region #1 and UE 1 can detect a cellular signal from Cell 1 to Cell 3, but the strength or quality of the cellular signal measured by UE 1 is dominant in the Cell 1 and 2.

Afterwards, it is further assumed that if UE 1 moves to region #2, UE 1 can detect a cellular signal from Cell 1 to 3, but the strength or quality of the cellular signal measured by UE 1 is dominant in the Cell 2 and 3.

In this case, the system of FIG. 22 can be designed so that while UE (or user or service) A located in region #1 is using D2D ID #001, another UE (or user or service) B located in a different region #2 can also use the same D2D ID of #001 at the same time (spatial reuse). In other words, even if a UE receive '001' from a different D2D UE as the same D2D ID (namely D2D expression code), the UE can interpret the received D2D ID differently.

At this time, the region #1 and #2 should satisfy a predetermined condition to reuse the same D2D ID.

For example, if a D2D ID is attempted to be reused by comparing cellular signals based on eNB cell IDs (for example, strength or quality (for example, RSRP (Reference Signal Received Power), RSRQ (Reference Signal Received Quality), RSSI (Receive Strength Signal Indicator), SNR (Signal-to-Noise Ratio), SINR (Signal to Interference plus Noise Ratio), and so on) of a synchronization signal (namely, Primary Synchronization Signal (PSS) or Secondary Synchronization Signal (SSS)), pilot signal, reference signal, and so on), a criterion has to be specified, which specifies how much difference in the strength or quality of a cellular signal in question is required or how long the difference has to be lasted for the D2D ID to be reused.

For example, if a measured value of strength or quality of a cellular signal received from cell 1 by a UE at a specific position shows a difference larger than a predetermined value from the measured value of strength or quality of a cellular signal received from cell 1 by the UE after moving to another position or the difference lasts for a predetermined time period, the UE can apply a decision criterion for a new D2D ID. In other words, even if the same D2D ID is received from a different D2D UE, the UE can interpret the received D2D ID as a different one. To calculate or obtain signal strength and a detected cell list accurately, a criterion for real-time signal strength and quality, namely a threshold value or an average value, upper x % value (for example, x=30), and the like has to be specified. Specification of an accurate value can be varied depending on system implementation.

In this case, the UE can interpret the D2D ID on the basis of the ID of a cell exhibiting the strongest signal strength or the best signal quality. For example, if strength or quality of a cellular signal from cell 1 received at a particular region shows the strongest strength or the best quality, the UE interprets the received D2D ID '001' as UE (or user or service) A; meanwhile, if strength or quality of a cellular signal from cell 2 received at a different region shows the strongest strength or the best quality, the UE can interpret the received D2D ID '001' as UE (or user or service) B.

Similarly, a D2D ID may be interpreted on the basis of a cell ID of a cellular signal showing strength or quality which is larger than a particular threshold value or an average value or corresponds to upper x %. For example, if a cellular signal from cell 1 and cell 2 received at a particular region is larger than a specific threshold value or an average value or shows strength or quality corresponding to upper x %, the UE can interpret the received D2D ID '001' as UE (or user or service) A; meanwhile, if a cellular signal from cell 2 and cell 3 received from another region is larger than a specific threshold value or an average value or shows strength or quality corresponding to upper x %, the UE can interpret the received D2D ID '001' as UE (or user or service) B.

In this way, an actual UE (or user or service) can be identified through a cellular signal even when the same D2D ID is used. In other words, the UE finally determines the actual device ID of a D2D device/AP on the basis of a combination of the information about strength or quality of a cellular signal and D2D IDs received from the D2D device/AP.

The determination above can be carried out in the upper layer. In this case, a list of cell IDs detected in the physical layer, information about strength or quality of a cellular signal, contents of a detected message, and information of a detected resource region are provided to the upper layer (for example, an application layer); and the upper layer finds out an actual entity of the corresponding ID by directly analyzing the information or transmitting combined information to a D2D server.

The embodiment above determines whether to reuse an ID by measuring a specific signal, processing the measured values, and comparing the processed values with each other. On the other hand, whether to reuse an ID may be determined by measuring part, a combination, or all of a plurality of signals (for example, synchronization signal, reference signal, pilot signal, discovery signal, and so on) received from a plurality of cells; and utilizing a distribution of the measured values. The latter scheme operates on the basis of a kind of statistical values of received signals, which will be described with reference to the drawings below.

FIG. 23 illustrates a method for determining a UE identifier according to one embodiment of the present invention.

FIG. 23 assumes a situation that UE 1 is able to detect a cellular signal transmitted from cell 1 to cell 3, but strength or quality of a cellular signal measured at UE 1 is satisfactory in the order of cell 1, cell 2, and cell 3.

It is further assumed that UE 2 is also detect a cellular signal transmitted from cell 1 to cell 3, but strength or quality of a cellular signal measured at UE 2 is satisfactory in the order of cell 2, cell 3, and cell 1.

Even though it can be regarded that UE 1 and UE 2 have received the same D2D IDs from D2D AP/UEs, the D2D IDs may not be the same to each other since the order of a cell list detected on the basis of RSRP and others is different. For example, if the final D2D ID determined by UE 1 is '100', then the final D2D ID determined by UE 2 can be '200'.

More specifically, the UE measures strength or quality of various signals such as cellular signals (or in the case of D2D beacon signals, discovery signals or synchronization signals/channels) based on cell IDs received from various cells and arranges instantaneous values or average values according to their magnitudes. And the UE checks upper K (K=1, 2, . . . ) values of the arranged measurement values or cells belonging to upper K %; and by using a combination of the cell IDs, interprets the D2D ID that another UE (D2D beacon device or D2D AP (Access Point), shop advertisement AP, and so on) currently transmits.

In other words, the final device ID is determined by utilizing upper x values or upper x % of cell list values from among the list of detected cells; information about which cell exhibits the highest signal strength/quality; an order distribution of upper y values or values belonging to upper y % when cells are arranged in the order of magnitudes of signal strength/quality; information of a list of cells showing detected signal strength/quality larger than an average value; and others.

The determination above can be carried out in the upper layer. In this case, a list of cell IDs detected in the physical layer, information about strength or quality of a cellular signal, contents of a detected message, and information of a detected resource region are provided to the upper layer (for example, an application layer); and the upper layer finds out an actual entity of the corresponding ID by directly analyzing the information or transmitting combined information to a D2D server.

In other words, the UE or the D2D server finally determines the actual device ID of a D2D device/AP on the basis of a combination of an upper list of strength or quality of cellular signals and D2D IDs received from the D2D device/AP.

If a D2D UE receiving a D2D signal moves to receive advertisement of another D2D UE and a combination/statistics of cellular signals based on received cell IDs is changed, the same D2D ID received can be interpreted differently. For example, suppose the UE measures strength or quality of a cellular signal and measurement values are arranged in the order of cell 1, cell 2, and cell 3 in terms of magnitude. In this case, the UE can interpret the received D2D ID '001' as UE (or user or service) A. Also, if the UE measures strength or quality of a cellular signal in a different region and measurement values are arranged in the order of cell 2, cell 3, and cell 1 in terms of magnitude, the UE can interpret the received D2D ID '001' as UE (or user or service) B.

Cell IDs are usually assigned on the basis of regions, which is closely related to movement of D2D UEs. Therefore, as described in the embodiment above, a moving D2D UE can interpret a received D2D ID by using the measurement value of a cellular signal obtained at its current position.

The scheme above is definitely related to how many advertisement IDs are to be reused. In other words, if reuse of D2D IDs is attempted in a large regional scale and the UE moves only a small distance, arrangement of D2D IDs should be such that the same D2D ID is not used in a shopping area.

Also, to increase the efficiency of using D2D IDs, the same D2D ID can be made to be interpreted differently depending on the time the D2D ID is used. This feature is based on the assumption that all of the D2D UEs are operating according to a common timing reference. In other words, the aforementioned feature can be realized if at least a common timer is used or absolute time is known among the D2D UEs or relative time differences are known among the D2D UEs.

Different UEs (or users or services) can be made to transmit the same D2D ID while avoiding overlapping of transmission in the same time slot; then a receiving UE can be made to interpret two D2D IDs received at different timing as the messages transmitted by two different UEs (or users or services). This scheme is a kind of time division technique, which can be thought of as a method for sharing a D2D ID. The time division technique can be employed as one of methods for improving efficiency since in most cases the possibility of using D2D IDs continuously (for example, contiguous subframes) is very low, though the time division technique is not feasible for the case where one UE (or user or service) uses a D2D ID continuously.

For example, if a UE receives a D2D ID '001' from a subframe of which the n (subframe index) mod 4 value corresponds to 0 and 1, the UE can interpret the received D2D ID '001' as UE (or user or service) A. Also, if a UE receives a D2D ID '001' from a subframe of which the n (subframe index) mod 4 value corresponds to 2 and 3, the UE can interpret the received D2D ID '001' as UE (or user or service) B.

Time and place may be utilized at the same time. In other words, a D2D ID transmitted from a particular place and at particular time is interpreted depending on the place and time. Even if the same D2D ID is used but at a different place and in a different time unit, the D2D ID can be regarded as having a different meaning since the place and time are different.

For example, suppose measurement values of strength or quality of cellular signals received by a UE are arranged in the order of cell 1, cell 2, and cell 3; and the UE receives a D2D ID '001' from a subframe of which the n (subframe index) mod 4 value corresponds to 0 and 1. Then the UE can interpret the received D2D ID '001' as UE (or user or service) A. Also further suppose measurement values of strength or quality of cellular signals received by a UE are arranged in the order of cell 1, cell 2, and cell 3; and the UE receives a D2D ID '001' from a subframe of which the n (subframe index) mod 4 value corresponds to 2 and 3. Then the UE can interpret the received D2D ID '001' as UE (or user or service) B. Likewise if it is assumed that measurement values of strength or quality of cellular signals received by a UE are arranged in the order of cell 2, cell 3, and cell 1; and the UE receives a D2D ID '001' from a subframe of which the n (subframe index) mod 4 value corresponds to 0 and 1. Then the UE can interpret the received D2D ID '001' as UE (or user or service) C. Also if it is assumed that measurement values of strength or quality of cellular signals received by a UE are arranged in the order of cell 2, cell 3, and cell 1; and the UE receives a D2D ID '001' from a subframe of which the n (subframe index) mod 4 value corresponds to 2 and 3. Then the UE can interpret the received D2D ID '001' as UE (or user or service) D.

Meanwhile, since different resource set can be employed for each cell to transmit and receive a D2D signal, the D2D signals detected from different resource sets can be reported to the upper layer in association with a cell ID list detected in conjunction with the D2D signals.

In the upper layer, a D2D UE ID can be determined autonomously on the basis of a resource set which has received the D2D signal or by inquiring of the D2D server.

Also, since different resource sets can be used for the respective cells (or cell groups), reporting information about resource sets from which the respective D2D signals have been detected to the upper layer is indeed equivalent to providing additional information; thus the upper layer can figure out the situation of the physical layer in more detail and provide the findings for system operation. For example, in case the network runs the system differently by configuring different parameters for the respective resource sets (for example, transmission and reception power, interference level, and discovery resource type 1 or 2) to get a subsidiary effect, the scheme above can be utilized to figure out how many D2D signals are detected from which resource, type and/or method.

FIG. 24 illustrates a method for determining a UE identifier according to one embodiment of the present invention.

With reference to FIG. 24, a first UE receives a D2D signal from a second UE S2401. At this time, the D2D signal includes a D2D ID of a D2D UE which has transmitted the D2D signal.

The UE determines the ID of the second UE on the basis of the received D2D ID, information about a measurement value of strength or quality of the cellular signal and/or information about a resource which has received the D2D signal S2403.

As described above, the UE can determine the ID of the second UE by analyzing the D2D ID on the basis of the ID of the cell showing the best signal strength or quality. Also, the UE may determine the ID of the second UE by analyzing the D2D ID on the basis of the cell ID of a cellular signal the strength or quality of which is larger than a particular threshold value or an average value or falls within upper x % of the strength or quality.

Also, the UE can arrange instantaneous values or average values of measurement values of strength or quality of cellular signals based on cell IDs received from various cells, analyze a D2D ID on the basis of a combination of arranged cell IDs, and determine the ID of the second UE.

Also, the UE may determine the ID of the second UE by analyzing the D2D ID on the basis of a temporal resource (for example, subframe) which has received the D2D signal.

Also, since each cell can set a resource set for a UE to transmit and receive a D2D signal differently, the UE may determine the ID of the second UE by analyzing the D2D ID on the basis of the resource set (for example, a subframe pool and/or resource block pool) which has received the D2D signal.

Also, as another embodiment, the UE transmits different D2D IDs to different resources, and a receiver determines one UE ID by collecting the two D2D IDs, which will be described with reference to the drawings below.

FIG. 25 illustrates a method for determining a UE identifier according to one embodiment.

With reference to FIG. 25, a first UE receives a first D2D signal from a first resource unit S2501. At this time, the first D2D signal includes a first D2D ID of a second UE which has transmitted a D2D signal.

And the first UE receives a second D2D signal from a second resource unit S2503. At this time, the second D2D signal includes a second D2D ID of the second UE which has transmitted a D2D signal.

The UE determines a second UE ID by combining the first D2D ID and the second D2D ID S2505.

In other words, each UE can use two D2D resource units (for example, discovery resources) and identify a final UE ID by using a combination of D2D IDs detected from each D2D resource unit. For example, if two particular D2D IDs are detected simultaneously within a predetermined time period or from predetermined resource units with respect to a particular service, an ID determined from a combination of the corresponding two D2D IDs becomes the final UE ID.

However, although the embodiment above has been described with respect to an embodiment where the final UE ID is determined from a combination of two D2D IDs, the present invention is not limited to the case of using two D2D IDs.

The method described above is advantageous in that the UE ID can be extended in the upper layer without increasing the length of a D2D ID in the physical layer. To this purpose, the physical layer should package D2D IDs detected during a predetermined time period or from a predetermined resource unit into a list to report the list to the upper layer.

Meanwhile, in order for a UE (for example, upper layer of the UE) to determine the final UE ID by analyzing D2D IDs autonomously, the UE can receive information for determining the UE ID beforehand from the D2D server, which will be described with reference to the drawings below.

FIG. 26 illustrates a method for determining a UE identifier according to one embodiment.

With reference to FIG. 26, a UE receives reference information for determining a UE ID from the D2D server S2601.

At this time, the reference information for determining a UE ID can include a combination of a cell ID of a cell showing the best strength or quality of a cellular signal and a D2D ID; and mapping information in association with the UE ID. Also, the reference information can include a combination of a D2D ID and a cell ID of a cellular signal of which the strength or quality is larger than a specific threshold value or an average value or falls within upper x % thereof; and mapping information in association with the UE ID.

Also, the reference information for determining a UE ID can include a combination of a D2D ID and a cell ID arranged according to the order of magnitude of a measurement value of strength or quality of a cellular signal; and mapping information in association with the UE ID.

Also, the reference information for determining a UE ID can include a combination of a D2D ID and a time resource (for example, subframe) which has received a D2D signal; and mapping information in association with the UE ID.

Also, the reference information for determining a UE ID can include can include a combination of a D2D ID and a resource set (namely subframe set and/or resource block set) transmitting a D2D signal to each cell; and mapping information in association with the UE ID.

Also in case the UE ID is determined from a combination of a plurality of D2D IDs, the reference information for determining the UE ID can include resource unit information or time information for receiving a plurality of D2D IDs.

The UE ID is determined on the basis of reference information for determining the UE ID received from the D2D server S2603.

At this time, the UE can determine the UE ID by using the methods described with reference to FIGS. 22 to 25, detailed descriptions of which will be omitted.

Also, the D2D ID can be analyzed by the upper layer (for example, application layer) of the UE in association with the D2D server, which will be described with reference to the drawings below.

FIG. 27 illustrates a method for determining a UE identifier according to one embodiment.

With reference to FIG. 27, a first UE receives a D2D signal from a second UE S2701. At this time, the D2D signal includes the D2D ID of a UE which has transmitted the D2D signal.

And the UE transmits the received D2D ID and information for determining the UE ID to the D2D server S2703.

For example, the physical layer of the UE reports a list of a series of detected D2D IDs to the upper layer along with a list of detected cell IDs or information about a measurement value of strength or quality of a cellular signal and/or serving cell information.

And the upper layer (for example, application layer) identifies an actual UE ID by using a combination of the cell ID list and the D2D IDs when retrieving the information from a relevant server (for example, ProSe server).

In other words, information for determining a UE ID can include a cell ID list for the cells in which a cellular signal has been detected and information about measurement values of strength or quality of the cellular signals and/or serving cell information.

Also, information for determining a UE ID can include information about a time resource (for example, subframe) which has received a D2D signal or information about a resource set (namely subframe set and/or resource block set).

Also, information for determining a UE ID can include a plurality of received D2D IDs.

The D2D server determines a D2D UE ID on the basis of the information for determining a D2D ID and a UE ID 52705.

For example, the UE ID is determined by a combination of a specific D2D ID and a cell ID list, and if the corresponding cell ID list contains the cell which provides a cellular signal showing the best strength or quality, the UE ID associated with the cell providing a cellular signal with the best strength or quality can be determined by using the detected D2D ID. As described above, if the cell providing a cellular signal with the best strength or quality is changed to another cell, the D2D ID then indicates a different UE ID.

Also, the UE ID may be determined on the basis of a combination of a D2D ID and a cell ID arranged according to the order of magnitude of strength or quality of a cellular signal.

Also, the UE ID may be determined on the basis of a combination of a D2D ID and a time resource (for example, subframe) or a resource set (namely subframe set and/or resource block set) which has received a D2D signal.

Also, in case the UE ID is determined by combining a plurality of D2D IDs, the UE ID may be determined by combining a plurality of received D2D IDs.

And the D2D server transmits the determined UE ID to the UE S2707.

As described above, the method according to the present invention enables a D2D ID (for example, ProSe ID, D2D ID, and ProSe application ID) representing a D2D UE and a service to be reused, which enables one shop to use a plurality of D2D IDs in a more inexpensive way. Also, by doing so, a D2D signal carrying limited information can transmit a varying D2D ID and thus, by employing a combination of D2D IDs, much more information can be specified.

Meanwhile, the method described above introduced a cell ID or a cell ID-based signal as a representative means of determining a UE's position. However, the method is only an example, and the present invention is not limited thereto. In other words, in case a fixed radio transmitter such as a WiFi AP or a D2D AP transmits its unique ID, the D2D ID can be reused by estimating a place change or a time change on the basis of the information obtained by receiving/measuring the signal.

General Wireless Communication Device to which an Embodiment of the Present Invention May be Applied FIG. 28 illustrates a block diagram of a wireless communication device according to an embodiment of the present invention.

Referring to FIG. 28, the wireless communication system includes an eNB 2810 and a plurality of UEs 2820 placed within the area of the eNB 2810.

The eNB 2810 includes a processor 2811, memory 2812, and a Radio Frequency (RF) unit 2813. The processor 2811 implements the functions, processes and/or methods proposed with reference to FIGS. 1 to 27. The layers of the radio interface protocol may be implemented by the processor 2811. The memory 2812 is connected to the processor 2811 and stores various types of information for driving the processor 2811. The RF unit 2813 is connected to the processor 2811 and sends and/or receives radio signals.

The UE 2820 includes a processor 2821, memory 2822, and an RF unit 2823. The processor 2821 implements the functions, processes and/or methods proposed with reference to FIGS. 1 to 27. The layers of the radio interface protocol may be implemented by the processor 2821. The memory 2822 is connected to the processor 2821 and stores various types of information for driving the processor 2821. The RF unit 2823 is connected to the processor 2821 and sends and/or receives radio signals.

The memory 2812, 2822 may be placed inside or outside the processor 2811, 2821 and may be connected to the processor 2811, 2821 by well-known various means. Furthermore, the eNB 2810 and/or the UE 2820 may have a single antenna or multiple antennas.

Hereinafter, detailed embodiments of the present invention are described in detail with reference to the accompanying drawings. Each of elements or characteristics may be considered to be optional unless otherwise described explicitly. Each element or characteristic may be implemented in such a way as not to be combined with other elements or characteristics. Furthermore, some of the elements and/or the characteristics may be combined to form an embodiment of the present invention. Order of operations described in connection with the embodiments of the present invention may be changed. Some of the elements or characteristics of an embodiment may be included in another embodiment or may be replaced with corresponding elements or characteristics of another embodiment. It is evident that in the claims, one or more embodiments may be constructed by combining claims not having an explicit citation relation or may be included as one or more new claims by amendments after filing an application.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method for determining a user equipment identifier in a wireless communication system according to an embodiment of the present invention has been illustrated as being applied to 3GPP LTE/LTE-A systems, but may be applied to various wireless communication systems other than the 3GPP LTE/LTE-A systems.

The invention claimed is:

1. A method for determining, by a first user equipment (UE), an identifier (ID) of a second UE in a wireless communication system supporting device-to-device (D2D) communication, the method comprising:
receiving, from the second UE, a D2D signal including a D2D ID; and
determining the ID of the second UE based on the received D2D ID and measurement information of a cellular signal for each of the second UE and a third UE when the received D2D ID is same as a D2D ID of the third UE, wherein the cellular signal is one of a primary synchronization signal (PSS), a secondary synchronization signal (SSS), and a reference signal, and wherein the ID of the second UE is determined based on an ID of a cell exhibiting the highest strength or quality of the cellular signal.

2. The method of claim 1, wherein the ID of the second UE is determined based on a combination of IDs of cells arranged in the order of strength or quality of the cellular signal.

3. The method of claim 1, wherein the measurement information is at least one of Reference Signal Received Power (RSRP), Reference Signal Received Quality (RSRQ), Receive Strength Signal Indicator (RSSI), Signal-to-Noise Ratio (SNR) or Signal to Interference plus Noise Ratio (SINR) measured by using the cellular signal.

4. The method of claim 1, further comprising receiving, by the first UE, reference information for determining the ID of the second UE from a D2D server, wherein the reference information includes:

a combination of a resource in which the D2D ID is received and the D2D ID, and mapping information of a UE ID, and wherein the ID of the second UE is determined based on the reference information.

5. The method of claim 4, wherein the reference information includes:

a combination of an ID of a cell arranged according to magnitude of a measurement value of strength or quality of the cellular signal and the D2D ID, and mapping information of a UE ID.

6. A first user equipment (UE) for determining an identifier (ID) of a second UE in a wireless communication system supporting device-to-device (D2D) communication, the first UE comprising:

a transceiver configured to transmit and receive a radio signal; and a processor, wherein the processor is configured to:

control the transceiver to receive a D2D signal including a D2D ID from the second UE, and determine the ID of the second UE based on the D2D ID received by the transceiver and measurement information of a cellular signal for each of the second UE and a third UE when the received D2D ID is same as a D2D ID of the third UE, wherein the cellular signal is one of a primary synchronization signal (PSS), a secondary synchronization signal (SSS), and a reference signal, and wherein the ID of the second UE is determined based on an ID of a cell exhibiting the highest strength or quality of the cellular signal.

* * * * *